(12) United States Patent
McBride et al.

(10) Patent No.: US 8,495,872 B2
(45) Date of Patent: *Jul. 30, 2013

(54) ENERGY STORAGE AND RECOVERY UTILIZING LOW-PRESSURE THERMAL CONDITIONING FOR HEAT EXCHANGE WITH HIGH-PRESSURE GAS

(75) Inventors: Troy O. McBride, Norwich, VT (US); Benjamin R. Bollinger, Windsor, VT (US)

(73) Assignee: SustainX, Inc., Seabrook, NH (US)

( * ) Notice: Subject to any disclaimer, the term of this patent is extended or adjusted under 35 U.S.C. 154(b) by 70 days.

This patent is subject to a terminal disclaimer.

(21) Appl. No.: 13/211,440

(22) Filed: Aug. 17, 2011

(65) Prior Publication Data

US 2011/0314810 A1 Dec. 29, 2011

Related U.S. Application Data

(60) Provisional application No. 61/375,402, filed on Aug. 20, 2010.

(51) Int. Cl.
*F01K 21/04* (2006.01)
(52) U.S. Cl.
USPC .................................. 60/511; 60/512; 60/515
(58) Field of Classification Search
USPC ................ 60/508–515; 91/4 R, 4 A
See application file for complete search history.

(56) References Cited

U.S. PATENT DOCUMENTS

| | | | |
|---|---|---|---|
| 114,297 A | 5/1871 | Ivens et al. |
| 224,081 A | 2/1880 | Eckart |
| 233,432 A | 10/1880 | Pitchford |
| 1,353,216 A | 9/1920 | Carlson |
| 1,635,524 A | 7/1927 | Aikman |
| 1,681,280 A | 8/1928 | Bruckner |
| 2,025,142 A | 12/1935 | Zahm et al. |
| 2,042,991 A | 6/1936 | Harris, Jr. |
| 2,141,703 A | 12/1938 | Bays |
| 2,280,100 A | 4/1942 | SinQleton |
| 2,280,845 A | 4/1942 | Parker |
| 2,404,660 A | 7/1946 | Rouleau |
| 2,420,098 A | 5/1947 | Rouleau |
| 2,486,081 A | 10/1949 | Weenen |
| 2,539,862 A | 1/1951 | Rushinq |
| 2,628,564 A | 2/1953 | Jacobs |
| 2,632,995 A | 3/1953 | Noe |

(Continued)

FOREIGN PATENT DOCUMENTS

| BE | 898225 | 3/1984 |
|---|---|---|
| BE | 1008885 | 8/1996 |
| CN | 1061262 | 5/1992 |
| CN | 1171490 | 1/1998 |
| CN | 1276308 | 12/2000 |

(Continued)

OTHER PUBLICATIONS

"Hydraulic Transformer Supplies Continuous High Pressure," Machine Design, Penton Media, vol. 64, No. 17, (Aug. 1992), 1 page.

(Continued)

*Primary Examiner* — Hoang Nguyen
(74) *Attorney, Agent, or Firm* — Bingham McCutchen LLP

(57) ABSTRACT

In various embodiments, gas is compressed to store energy and/or expanded to recover energy to or from high pressures, and the gas is exchanges heat with a heat-exchange fluid that is thermally conditioned at low pressures.

22 Claims, 9 Drawing Sheets

U.S. PATENT DOCUMENTS

| | | |
|---|---|---|
| 2,712,728 A | 7/1955 | Lewis et al. |
| 2,813,398 A | 11/1957 | Wilcox |
| 2,829,501 A | 4/1958 | Walls |
| 2,880,759 A | 4/1959 | Wisman |
| 3,041,842 A | 7/1962 | Heinecke |
| 3,100,965 A | 8/1963 | Blackburn |
| 3,236,512 A | 2/1966 | Caslav et al. |
| 3,269,121 A | 8/1966 | Ludwig |
| 3,538,340 A | 11/1970 | LanQ |
| 3,608,311 A | 9/1971 | Roesel, Jr. |
| 3,648,458 A | 3/1972 | McAlister |
| 3,650,636 A | 3/1972 | Eskeli |
| 3,672,160 A | 6/1972 | Kim |
| 3,677,008 A | 7/1972 | Koutz |
| 3,704,079 A | 11/1972 | Berlyn |
| 3,757,517 A | 9/1973 | RiQollot |
| 3,793,848 A | 2/1974 | Eskeli |
| 3,801,793 A | 4/1974 | Goebel |
| 3,803,847 A | 4/1974 | McAlister |
| 3,839,863 A | 10/1974 | Frazier |
| 3,847,182 A | 11/1974 | Greer |
| 3,895,493 A | 7/1975 | Rigollot |
| 3,903,696 A | 9/1975 | Carman |
| 3,935,469 A | 1/1976 | Haydock |
| 3,939,356 A | 2/1976 | Loane |
| 3,942,323 A | 3/1976 | Maillet |
| 3,945,207 A | 3/1976 | Hyatt |
| 3,948,049 A | 4/1976 | Ohms et al. |
| 3,952,516 A | 4/1976 | Lapp |
| 3,952,723 A | 4/1976 | Browning |
| 3,958,899 A | 5/1976 | Coleman, Jr. et al. |
| 3,986,354 A | 10/1976 | Erb |
| 3,988,592 A | 10/1976 | Porter |
| 3,988,897 A | 11/1976 | Strub |
| 3,990,246 A | 11/1976 | Wilmers |
| 3,991,574 A | 11/1976 | Frazier |
| 3,996,741 A | 12/1976 | HerberQ |
| 3,998,049 A | 12/1976 | McKinley et al. |
| 3,999,388 A | 12/1976 | Nystrom |
| 4,008,006 A | 2/1977 | Bea |
| 4,027,993 A | 6/1977 | Wolff |
| 4,030,303 A | 6/1977 | Kraus et al. |
| 4,031,702 A | 6/1977 | Burnett et al. |
| 4,031,704 A | 6/1977 | Moore et al. |
| 4,041,708 A | 8/1977 | Wolff |
| 4,050,246 A | 9/1977 | Bourquardez |
| 4,055,950 A | 11/1977 | Grossman |
| 4,058,979 A | 11/1977 | Germain |
| 4,075,844 A | 2/1978 | Schiferli |
| 4,089,744 A | 5/1978 | Cahn |
| 4,094,356 A | 6/1978 | Ash et al. |
| 4,095,118 A | 6/1978 | Ratbun |
| 4,100,745 A | 7/1978 | Gyarmathy et al. |
| 4,104,955 A | 8/1978 | Murphy |
| 4,108,077 A | 8/1978 | Laing |
| 4,109,465 A | 8/1978 | Plen |
| 4,110,987 A | 9/1978 | Cahn et al. |
| 4,112,311 A | 9/1978 | Theyse |
| 4,117,342 A | 9/1978 | Melley, Jr. |
| 4,117,696 A | 10/1978 | Fawcett et al. |
| 4,118,637 A | 10/1978 | Tackett |
| 4,124,182 A | 11/1978 | Loeb |
| 4,126,000 A | 11/1978 | Funk |
| 4,136,432 A | 1/1979 | Melley, Jr. |
| 4,142,368 A | 3/1979 | Mantegani |
| 4,147,204 A | 4/1979 | Pfenninger |
| 4,149,092 A | 4/1979 | Cros |
| 4,150,547 A | 4/1979 | Hobson |
| 4,154,292 A | 5/1979 | Herrick |
| 4,167,372 A | 9/1979 | Tackett |
| 4,170,878 A | 10/1979 | Jahniq |
| 4,173,431 A | 11/1979 | Smith |
| 4,189,925 A | 2/1980 | Long |
| 4,194,889 A | 3/1980 | Wanner |
| 4,195,481 A | 4/1980 | Gregory |
| 4,197,700 A | 4/1980 | Jahniq |
| 4,197,715 A | 4/1980 | Fawcett et al. |
| 4,201,514 A | 5/1980 | Huetter |
| 4,204,126 A | 5/1980 | Diggs |
| 4,206,608 A | 6/1980 | Bell |
| 4,209,982 A | 7/1980 | Pitts |
| 4,220,006 A | 9/1980 | Kindt |
| 4,229,143 A | 10/1980 | Pucher |
| 4,229,661 A | 10/1980 | Mead et al. |
| 4,232,253 A | 11/1980 | Mortelmans |
| 4,237,692 A | 12/1980 | Ahrens et al. |
| 4,242,878 A | 1/1981 | Brinkerhoff |
| 4,246,978 A | 1/1981 | Schulz et al. |
| 4,262,735 A | 4/1981 | Courrege |
| 4,273,514 A | 6/1981 | Shore et al. |
| 4,274,010 A | 6/1981 | Lawson-tancred |
| 4,275,310 A | 6/1981 | Summers et al. |
| 4,281,256 A | 7/1981 | Ahrens |
| 4,293,323 A | 10/1981 | Cohen |
| 4,299,198 A | 11/1981 | Woodhull |
| 4,302,684 A | 11/1981 | Gogins |
| 4,304,103 A | 12/1981 | Hamrick |
| 4,311,011 A | 1/1982 | Lewis |
| 4,316,096 A | 2/1982 | Syverson |
| 4,317,439 A | 3/1982 | Emmerlinq |
| 4,335,867 A | 6/1982 | Bihlmaier |
| 4,340,822 A | 7/1982 | Gregg |
| 4,341,072 A | 7/1982 | Clyne |
| 4,348,863 A | 9/1982 | Taylor et al. |
| 4,353,214 A | 10/1982 | Gardner |
| 4,354,420 A | 10/1982 | Bianchetta |
| 4,355,956 A | 10/1982 | Ringrose et al. |
| 4,358,250 A | 11/1982 | Payne |
| 4,367,786 A | 1/1983 | Hafner et al. |
| 4,368,692 A | 1/1983 | Kita |
| 4,368,775 A | 1/1983 | Ward |
| 4,370,559 A | 1/1983 | Langley, Jr. |
| 4,372,114 A | 2/1983 | Burnham |
| 4,375,387 A | 3/1983 | deFilippi et al. |
| 4,380,419 A | 4/1983 | Morton |
| 4,392,062 A | 7/1983 | Bervig |
| 4,393,752 A | 7/1983 | Meier |
| 4,411,136 A | 10/1983 | Funk |
| 4,416,114 A | 11/1983 | Martini |
| 4,421,661 A | 12/1983 | Claar et al. |
| 4,428,711 A | 1/1984 | Archer |
| 4,435,131 A | 3/1984 | Ruben |
| 4,444,011 A | 4/1984 | Kolin |
| 4,446,698 A | 5/1984 | Benson |
| 4,447,738 A | 5/1984 | Allison |
| 4,449,372 A | 5/1984 | Rilett |
| 4,452,046 A | 6/1984 | Valentin |
| 4,452,047 A | 6/1984 | Hunt et al. |
| 4,454,429 A | 6/1984 | Buonome |
| 4,454,720 A | 6/1984 | Leibowitz |
| 4,455,834 A | 6/1984 | Earle |
| 4,462,213 A | 7/1984 | Lewis |
| 4,474,002 A | 10/1984 | Perry |
| 4,476,851 A | 10/1984 | Brugger et al. |
| 4,478,553 A | 10/1984 | Leibowitz et al. |
| 4,489,554 A | 12/1984 | Otters |
| 4,491,739 A | 1/1985 | Watson |
| 4,492,539 A | 1/1985 | Specht |
| 4,493,189 A | 1/1985 | Slater |
| 4,496,847 A | 1/1985 | Parkings |
| 4,498,848 A | 2/1985 | Petrovsky |
| 4,502,284 A | 3/1985 | Chrisoghilos |
| 4,503,673 A | 3/1985 | Schachle |
| 4,515,516 A | 5/1985 | Perrine et al. |
| 4,520,840 A | 6/1985 | Michel |
| 4,525,631 A | 6/1985 | Allison |
| 4,530,208 A | 7/1985 | Sato |
| 4,547,209 A | 10/1985 | Netzer |
| 4,574,592 A | 3/1986 | Eskeli |
| 4,585,039 A | 4/1986 | Hamilton |
| 4,589,475 A | 5/1986 | Jones |
| 4,593,202 A | 6/1986 | Dickinson |
| 4,619,225 A | 10/1986 | Lowther |
| 4,624,623 A | 11/1986 | Wagner |
| 4,648,801 A | 3/1987 | Wilson |
| 4,651,525 A | 3/1987 | Cestero |
| 4,653,986 A | 3/1987 | Ashton |

| Patent Number | Kind | Date | Inventor |
|---|---|---|---|
| 4,671,742 | A | 6/1987 | Gyimesi |
| 4,676,068 | A | 6/1987 | Funk |
| 4,679,396 | A | 7/1987 | Heggie |
| 4,691,524 | A | 9/1987 | Holscher |
| 4,693,080 | A | 9/1987 | Van Hooff |
| 4,706,456 | A | 11/1987 | Backe |
| 4,707,988 | A | 11/1987 | Palmers |
| 4,710,100 | A | 12/1987 | Laing et al. |
| 4,735,552 | A | 4/1988 | Watson |
| 4,739,620 | A | 4/1988 | Pierce |
| 4,760,697 | A | 8/1988 | Heggie |
| 4,761,118 | A | 8/1988 | Zanarini et al. |
| 4,765,142 | A | 8/1988 | Nakhamkin |
| 4,765,143 | A | 8/1988 | Crawford et al. |
| 4,767,938 | A | 8/1988 | Bervig |
| 4,792,700 | A | 12/1988 | Ammons |
| 4,849,648 | A | 7/1989 | Longardner |
| 4,870,816 | A | 10/1989 | Nakhamkin |
| 4,872,307 | A | 10/1989 | Nakhamkin |
| 4,873,828 | A | 10/1989 | Laing et al. |
| 4,873,831 | A | 10/1989 | Dehne |
| 4,876,992 | A | 10/1989 | Sobotowski |
| 4,877,530 | A | 10/1989 | Moses |
| 4,885,912 | A | 12/1989 | Nakhamkin |
| 4,886,534 | A | 12/1989 | Castan |
| 4,907,495 | A | 3/1990 | Sugahara |
| 4,936,109 | A | 6/1990 | Longardner |
| 4,942,736 | A | 7/1990 | Bronicki |
| 4,947,977 | A | 8/1990 | Raymond |
| 4,955,195 | A | 9/1990 | Jones et al. |
| 4,984,432 | A | 1/1991 | Corey |
| 5,056,601 | A | 10/1991 | Grimmer |
| 5,058,385 | A | 10/1991 | Everett, Jr. |
| 5,062,498 | A | 11/1991 | Tobias |
| 5,107,681 | A | 4/1992 | Wolfbauer, III |
| 5,133,190 | A | 7/1992 | Abdelmalek |
| 5,138,838 | A | 8/1992 | Crosser |
| 5,140,170 | A | 8/1992 | Henderson |
| 5,152,260 | A | 10/1992 | Erickson et al. |
| 5,161,449 | A | 11/1992 | Everett, Jr. |
| 5,169,295 | A | 12/1992 | Stogner et al. |
| 5,182,086 | A | 1/1993 | Henderson et al. |
| 5,203,168 | A | 4/1993 | Oshina |
| 5,209,063 | A | 5/1993 | Shirai et al. |
| 5,213,470 | A | 5/1993 | Lundquist |
| 5,239,833 | A | 8/1993 | Fineblum |
| 5,259,345 | A | 11/1993 | Richeson |
| 5,271,225 | A | 12/1993 | Adamides |
| 5,279,206 | A | 1/1994 | Krantz |
| 5,296,799 | A | 3/1994 | Davis |
| 5,309,713 | A | 5/1994 | Vassallo |
| 5,321,946 | A | 6/1994 | Abdelmalek |
| 5,327,987 | A | 7/1994 | Abdelmalek |
| 5,339,633 | A | 8/1994 | Fujii et al. |
| 5,341,644 | A | 8/1994 | Nelson |
| 5,344,627 | A | 9/1994 | Fujii et al. |
| 5,364,611 | A | 11/1994 | Iijima et al. |
| 5,365,980 | A | 11/1994 | DeBerardinis |
| 5,375,417 | A | 12/1994 | Barth |
| 5,379,589 | A | 1/1995 | Cohn et al. |
| 5,384,489 | A | 1/1995 | Bellac |
| 5,387,089 | A | 2/1995 | Stogner et al. |
| 5,394,693 | A | 3/1995 | Plyter |
| 5,427,194 | A | 6/1995 | Miller |
| 5,436,508 | A | 7/1995 | Sorensen |
| 5,448,889 | A | 9/1995 | Bronicki |
| 5,454,408 | A | 10/1995 | DiBella et al. |
| 5,454,426 | A | 10/1995 | Moseley |
| 5,467,722 | A | 11/1995 | Meratla |
| 5,477,677 | A | 12/1995 | Krnavek |
| 5,491,969 | A | 2/1996 | Cohn et al. |
| 5,491,977 | A | 2/1996 | Cho |
| 5,524,821 | A | 6/1996 | Yie et al. |
| 5,537,822 | A | 7/1996 | Shnaid et al. |
| 5,544,698 | A | 8/1996 | Paulman |
| 5,557,934 | A | 9/1996 | Beach |
| 5,561,978 | A | 10/1996 | Buschur |
| 5,562,010 | A | 10/1996 | McGuire |
| 5,579,640 | A | 12/1996 | Gray, Jr. et al. |
| 5,584,664 | A | 12/1996 | Elliott et al. |
| 5,592,028 | A | 1/1997 | Pritchard |
| 5,595,587 | A | 1/1997 | Steed |
| 5,598,736 | A | 2/1997 | Erskine |
| 5,599,172 | A | 2/1997 | Mccabe |
| 5,600,953 | A | 2/1997 | Oshita et al. |
| 5,616,007 | A | 4/1997 | Cohen |
| 5,634,340 | A | 6/1997 | Grennan |
| 5,641,273 | A | 6/1997 | Moseley |
| 5,674,053 | A | 10/1997 | Paul et al. |
| 5,685,154 | A | 11/1997 | Bronicki et al. |
| 5,685,155 | A | 11/1997 | Brown |
| 5,768,893 | A | 6/1998 | Hoshino et al. |
| 5,769,610 | A | 6/1998 | Paul et al. |
| 5,771,693 | A | 6/1998 | Coney |
| 5,775,107 | A | 7/1998 | Sparkman |
| 5,778,675 | A | 7/1998 | Nakhamkin |
| 5,794,442 | A | 8/1998 | Lisniansky |
| 5,797,980 | A | 8/1998 | Fillet |
| 5,819,533 | A | 10/1998 | Moonen |
| 5,819,635 | A | 10/1998 | Moonen |
| 5,831,757 | A | 11/1998 | DiFrancesco |
| 5,832,728 | A | 11/1998 | Buck |
| 5,832,906 | A | 11/1998 | Douville et al. |
| 5,839,270 | A | 11/1998 | Jirnov et al. |
| 5,845,479 | A | 12/1998 | Nakhamkin |
| 5,873,250 | A | 2/1999 | Lewis |
| 5,901,809 | A | 5/1999 | Berkun |
| 5,924,283 | A | 7/1999 | Burke, Jr. |
| 5,934,063 | A | 8/1999 | Nakhamkin |
| 5,934,076 | A | 8/1999 | Coney |
| 5,937,652 | A | 8/1999 | Abdelmalek |
| 5,971,027 | A | 10/1999 | Beachley et al. |
| 6,012,279 | A | 1/2000 | Hines |
| 6,023,105 | A | 2/2000 | Youssef |
| 6,026,349 | A | 2/2000 | Heneman |
| 6,029,445 | A | 2/2000 | Lech |
| 6,073,445 | A | 6/2000 | Johnson |
| 6,073,448 | A | 6/2000 | Lozada |
| 6,085,520 | A | 7/2000 | Kohno |
| 6,090,186 | A | 7/2000 | Spencer |
| 6,119,802 | A | 9/2000 | Puett, Jr. |
| 6,132,181 | A | 10/2000 | Mccabe |
| 6,145,311 | A | 11/2000 | Cyphelly |
| 6,148,602 | A | 11/2000 | Demetri |
| 6,153,943 | A | 11/2000 | Mistr, Jr. |
| 6,158,499 | A | 12/2000 | Rhodes |
| 6,170,443 | B1 | 1/2001 | Hofbauer |
| 6,178,735 | B1 | 1/2001 | Frutschi |
| 6,179,446 | B1 | 1/2001 | Sarmadi |
| 6,188,182 | B1 | 2/2001 | Nickols et al. |
| 6,202,707 | B1 | 3/2001 | Woodall et al. |
| 6,206,660 | B1 | 3/2001 | Coney et al. |
| 6,210,131 | B1 | 4/2001 | Whitehead |
| 6,216,462 | B1 | 4/2001 | Gray, Jr. |
| 6,225,706 | B1 | 5/2001 | Keller |
| 6,276,123 | B1 | 8/2001 | Chen et al. |
| 6,327,858 | B1 | 12/2001 | Negre et al. |
| 6,327,994 | B1 | 12/2001 | Labrador |
| 6,349,543 | B1 | 2/2002 | Lisniansky |
| RE37,603 | E | 3/2002 | Coney |
| 6,352,576 | B1 | 3/2002 | Spencer et al. |
| 6,360,535 | B1 | 3/2002 | Fisher |
| 6,367,570 | B1 | 4/2002 | Long, III |
| 6,372,023 | B1 | 4/2002 | Kiyono et al. |
| 6,389,814 | B2 | 5/2002 | Viteri et al. |
| 6,397,578 | B2 | 6/2002 | Tsukamoto |
| 6,401,458 | B2 | 6/2002 | Jacobson |
| 6,407,465 | B1 | 6/2002 | Peltz et al. |
| 6,419,462 | B1 | 7/2002 | Horie et al. |
| 6,422,016 | B2 | 7/2002 | Alkhamis |
| 6,453,659 | B1 | 9/2002 | Van Liere et al. |
| 6,478,289 | B1 | 11/2002 | Trewin |
| 6,484,498 | B1 | 11/2002 | Bonar, II |
| 6,512,966 | B2 | 1/2003 | Lof |
| 6,513,326 | B1 | 2/2003 | Maceda et al. |
| 6,516,615 | B1 | 2/2003 | Stockhausen et al. |
| 6,516,616 | B2 | 2/2003 | Carver |
| 6,554,088 | B2 | 4/2003 | Severinsky et al. |

| | | |
|---|---|---|
| 6,598,392 B2 | 7/2003 | Majeres |
| 6,598,402 B2 | 7/2003 | Kataoka et al. |
| 6,606,860 B2 | 8/2003 | McFarland |
| 6,612,348 B1 | 9/2003 | Wiley |
| 6,619,930 B2 | 9/2003 | Jansen et al. |
| 6,626,212 B2 | 9/2003 | Morioka et al. |
| 6,629,413 B1 | 10/2003 | Wendt et al. |
| 6,637,185 B2 | 10/2003 | Hatamiya et al. |
| 6,652,241 B1 | 11/2003 | Alder |
| 6,652,243 B2 | 11/2003 | Krasnov |
| 6,666,024 B1 | 12/2003 | Moskal |
| 6,670,402 B1 | 12/2003 | Lee et al. |
| 6,672,056 B2 | 1/2004 | Roth et al. |
| 6,675,765 B2 | 1/2004 | Endoh |
| 6,688,108 B1 | 2/2004 | Van Liere |
| 6,698,472 B2 | 3/2004 | Camacho et al. |
| 6,711,984 B2 | 3/2004 | Tagge et al. |
| 6,712,166 B2 | 3/2004 | Rush et al. |
| 6,715,514 B2 | 4/2004 | Parker, III |
| 6,718,761 B2 | 4/2004 | Merswolke et al. |
| 6,739,131 B1 | 5/2004 | Kershaw |
| 6,739,419 B2 | 5/2004 | Jain et al. |
| 6,745,569 B2 | 6/2004 | Gerdes |
| 6,745,801 B1 | 6/2004 | Cohen et al. |
| 6,748,737 B2 | 6/2004 | Lafferty |
| 6,762,926 B1 | 7/2004 | Shiue et al. |
| 6,786,245 B1 | 9/2004 | Eichelberger |
| 6,789,387 B2 | 9/2004 | Brinkman |
| 6,789,576 B2 | 9/2004 | Umetsu et al. |
| 6,797,039 B2 | 9/2004 | Spencer |
| 6,815,840 B1 | 11/2004 | Aldendeshe |
| 6,817,185 B2 | 11/2004 | Coney et al. |
| 6,834,737 B2 | 12/2004 | Bloxham |
| 6,840,309 B2 | 1/2005 | Wilson et al. |
| 6,848,259 B2 | 2/2005 | Keller-ornig |
| 6,857,450 B2 | 2/2005 | Rupp |
| 6,874,453 B2 | 4/2005 | Coney et al. |
| 6,883,775 B2 | 4/2005 | Coney et al. |
| 6,886,326 B2 | 5/2005 | Holtzapple et al. |
| 6,892,802 B2 | 5/2005 | Kelly et al. |
| 6,900,556 B2 | 5/2005 | Provanzana |
| 6,922,991 B2 | 8/2005 | Polcuch |
| 6,925,821 B2 | 8/2005 | Sienel |
| 6,927,503 B2 | 8/2005 | Enis et al. |
| 6,931,848 B2 | 8/2005 | Maceda et al. |
| 6,935,096 B2 | 8/2005 | Haiun |
| 6,938,415 B2 | 9/2005 | Last |
| 6,938,654 B2 | 9/2005 | Gershtein et al. |
| 6,946,017 B2 | 9/2005 | Leppin et al. |
| 6,948,328 B2 | 9/2005 | Kidwell |
| 6,952,058 B2 | 10/2005 | Mccoin |
| 6,959,546 B2 | 11/2005 | Corcoran |
| 6,963,802 B2 | 11/2005 | Enis |
| 6,964,165 B2 | 11/2005 | Uhl et al. |
| 6,964,176 B2 | 11/2005 | Kidwell |
| 6,974,307 B2 | 12/2005 | Antoune et al. |
| 7,000,389 B2 | 2/2006 | Lewellin |
| 7,007,474 B1 | 3/2006 | Ochs et al. |
| 7,017,690 B2 | 3/2006 | Burke |
| 7,028,934 B2 | 4/2006 | Burynski, Jr. |
| 7,040,083 B2 | 5/2006 | Horii et al. |
| 7,040,108 B1 | 5/2006 | Flammang |
| 7,040,859 B2 | 5/2006 | Kane |
| 7,043,920 B2 | 5/2006 | Viteri et al. |
| 7,047,744 B1 | 5/2006 | Robertson et al. |
| 7,055,325 B2 | 6/2006 | Wolken |
| 7,067,937 B2 | 6/2006 | Enish et al. |
| 7,075,189 B2 | 7/2006 | Heronemus |
| RE39,249 E | 8/2006 | Link, Jr. |
| 7,084,520 B2 | 8/2006 | Zambrano |
| 7,086,231 B2 | 8/2006 | Pinkerton |
| 7,093,450 B2 | 8/2006 | Jimenez Haertel et al. |
| 7,093,626 B2 | 8/2006 | Li et al. |
| 7,098,552 B2 | 8/2006 | Mccoin |
| 7,107,766 B2 | 9/2006 | Zacche' et al. |
| 7,107,767 B2 | 9/2006 | Frazer et al. |
| 7,116,006 B2 | 10/2006 | Mccoin |
| 7,124,576 B2 | 10/2006 | Cherney et al. |
| 7,124,586 B2 | 10/2006 | Negre et al. |
| 7,127,895 B2 | 10/2006 | Pinkerton et al. |
| 7,128,777 B2 | 10/2006 | Spencer |
| 7,134,279 B2 | 11/2006 | White |
| 7,155,912 B2 | 1/2007 | Enis et al. |
| 7,168,928 B1 | 1/2007 | West |
| 7,168,929 B2 | 1/2007 | Sieqel et al. |
| 7,169,489 B2 | 1/2007 | Redmond |
| 7,177,751 B2 | 2/2007 | Froloff |
| 7,178,337 B2 | 2/2007 | Pflanz |
| 7,191,603 B2 | 3/2007 | Taube |
| 7,197,871 B2 | 4/2007 | Yoshino |
| 7,201,095 B2 | 4/2007 | Hughey |
| 7,218,009 B2 | 5/2007 | Hendrickson et al. |
| 7,219,779 B2 | 5/2007 | Bauer et al. |
| 7,225,762 B2 | 6/2007 | Mahlanen |
| 7,228,690 B2 | 6/2007 | Barker |
| 7,230,348 B2 | 6/2007 | Poole |
| 7,231,998 B1 | 6/2007 | Schechter |
| 7,240,812 B2 | 7/2007 | Kamikozuru |
| 7,249,617 B2 | 7/2007 | Musselman et al. |
| 7,254,944 B1 | 8/2007 | Goetzinger et al. |
| 7,273,122 B2 | 9/2007 | Rose |
| 7,281,371 B1 | 10/2007 | Heidenreich |
| 7,308,361 B2 | 12/2007 | Enis et al. |
| 7,317,261 B2 | 1/2008 | Rolt |
| 7,322,377 B2 | 1/2008 | Baltes |
| 7,325,401 B1 | 2/2008 | Kesseli et al. |
| 7,328,575 B2 | 2/2008 | Hedman |
| 7,329,099 B2 | 2/2008 | Hartman |
| 7,347,049 B2 | 3/2008 | Rajendran et al. |
| 7,353,786 B2 | 4/2008 | Scuderi et al. |
| 7,353,845 B2 | 4/2008 | Underwood et al. |
| 7,354,252 B2 | 4/2008 | Baatrup et al. |
| 7,364,410 B2 | 4/2008 | Link, Jr. |
| 7,392,871 B2 | 7/2008 | Severinsky et al. |
| 7,406,828 B1 | 8/2008 | Nakhamkin |
| 7,407,501 B2 | 8/2008 | Zvuloni |
| 7,415,835 B2 | 8/2008 | Cowans et al. |
| 7,415,995 B2 | 8/2008 | Plummer et al. |
| 7,417,331 B2 | 8/2008 | De La Torre et al. |
| 7,418,820 B2 | 9/2008 | Harvey et al. |
| 7,436,086 B2 | 10/2008 | Mcclintic |
| 7,441,399 B2 | 10/2008 | Utamura |
| 7,448,213 B2 | 11/2008 | Mitani |
| 7,453,164 B2 | 11/2008 | Borden et al. |
| 7,469,527 B2 | 12/2008 | Negre et al. |
| 7,471,010 B1 | 12/2008 | Fingersh |
| 7,481,337 B2 | 1/2009 | Luharuka et al. |
| 7,488,159 B2 | 2/2009 | Bhatt et al. |
| 7,527,483 B1 | 5/2009 | Glauber |
| 7,579,700 B1 | 8/2009 | Meller |
| 7,603,970 B2 | 10/2009 | Scuderi et al. |
| 7,607,503 B1 | 10/2009 | Schechter |
| 7,693,402 B2 | 4/2010 | Hudson et al. |
| 7,694,514 B2 | 4/2010 | Smith et al. |
| 7,802,426 B2 | 9/2010 | Bollinger |
| 7,827,787 B2 | 11/2010 | Cherney et al. |
| 7,832,207 B2 | 11/2010 | McBride et al. |
| 7,843,076 B2 | 11/2010 | Gogoana et al. |
| 7,874,155 B2 | 1/2011 | McBride et al. |
| 7,900,444 B1 | 3/2011 | McBride et al. |
| 7,958,731 B2 | 6/2011 | McBride et al. |
| 7,963,110 B2 | 6/2011 | Bollinger et al. |
| 8,037,678 B2 | 10/2011 | McBride et al. |
| 8,046,990 B2 | 11/2011 | Bollinger et al. |
| 8,061,132 B2 * | 11/2011 | Fong et al. .................... 60/417 |
| 8,104,274 B2 | 1/2012 | McBride et al. |
| 8,109,085 B2 | 2/2012 | McBride et al. |
| 8,117,842 B2 | 2/2012 | McBride et al. |
| 8,122,718 B2 | 2/2012 | McBride et al. |
| 8,171,728 B2 | 5/2012 | Bollinger et al. |
| 8,191,362 B2 | 6/2012 | McBride et al. |
| 8,225,606 B2 | 7/2012 | McBride et al. |
| 8,234,862 B2 | 8/2012 | McBride et al. |
| 8,234,863 B2 | 8/2012 | McBride et al. |
| 8,234,868 B2 | 8/2012 | Bollinger et al. |
| 8,240,140 B2 | 8/2012 | McBride et al. |
| 8,240,146 B1 | 8/2012 | Bollinger |
| 8,245,508 B2 | 8/2012 | Bollinger et al. |

| Patent/Publication No. | Date | Inventor(s) |
|---|---|---|
| 8,250,863 B2 * | 8/2012 | Bollinger et al. .............. 60/511 |
| 8,272,212 B2 | 9/2012 | Blieske |
| 2001/0045093 A1 | 11/2001 | Jacobson |
| 2003/0131599 A1 | 7/2003 | Gerdes |
| 2003/0145589 A1 | 8/2003 | Tillyer |
| 2003/0177767 A1 | 9/2003 | Keller-sornig et al. |
| 2003/0180155 A1 | 9/2003 | Coney et al. |
| 2004/0050042 A1 | 3/2004 | Frazer |
| 2004/0050049 A1 | 3/2004 | Wendt et al. |
| 2004/0146406 A1 | 7/2004 | Last |
| 2004/0146408 A1 | 7/2004 | Anderson |
| 2004/0148934 A1 | 8/2004 | Pinkerton et al. |
| 2004/0211182 A1 | 10/2004 | Gould |
| 2004/0244580 A1 | 12/2004 | Coney et al. |
| 2004/0261415 A1 | 12/2004 | Negre et al. |
| 2005/0016165 A1 | 1/2005 | Enis et al. |
| 2005/0028529 A1 | 2/2005 | Bartlett et al. |
| 2005/0047930 A1 | 3/2005 | Schmid |
| 2005/0072154 A1 | 4/2005 | Frutschi |
| 2005/0115234 A1 | 6/2005 | Asano et al. |
| 2005/0155347 A1 | 7/2005 | Lewellin |
| 2005/0166592 A1 | 8/2005 | Larson et al. |
| 2005/0274334 A1 | 12/2005 | Warren |
| 2005/0275225 A1 | 12/2005 | Bertolotti |
| 2005/0279086 A1 | 12/2005 | Hoos |
| 2005/0279292 A1 | 12/2005 | Hudson et al. |
| 2005/0279296 A1 | 12/2005 | Coney et al. |
| 2006/0055175 A1 | 3/2006 | Grinblat |
| 2006/0059912 A1 | 3/2006 | Romanelli et al. |
| 2006/0059936 A1 | 3/2006 | Radke et al. |
| 2006/0059937 A1 | 3/2006 | Perkins et al. |
| 2006/0075749 A1 | 4/2006 | Cherney et al. |
| 2006/0090467 A1 | 5/2006 | Crow |
| 2006/0090477 A1 | 5/2006 | Rolff |
| 2006/0107664 A1 | 5/2006 | Hudson et al. |
| 2006/0162543 A1 | 7/2006 | Abe et al. |
| 2006/0162910 A1 | 7/2006 | Kelly et al. |
| 2006/0175337 A1 | 8/2006 | Defosset |
| 2006/0201148 A1 | 9/2006 | Zabtcioqlu |
| 2006/0248886 A1 | 11/2006 | Ma |
| 2006/0248892 A1 | 11/2006 | Ingersoll |
| 2006/0254281 A1 | 11/2006 | Badeer et al. |
| 2006/0260311 A1 | 11/2006 | Ingersoll |
| 2006/0260312 A1 | 11/2006 | Ingersoll |
| 2006/0262465 A1 | 11/2006 | Wiederhold |
| 2006/0266034 A1 | 11/2006 | Ingersoll |
| 2006/0266035 A1 | 11/2006 | Ingersoll et al. |
| 2006/0266036 A1 | 11/2006 | Ingersoll |
| 2006/0266037 A1 | 11/2006 | Ingersoll |
| 2006/0280993 A1 | 12/2006 | Keefer et al. |
| 2006/0283967 A1 | 12/2006 | Cho et al. |
| 2007/0006586 A1 | 1/2007 | Hoffman et al. |
| 2007/0022754 A1 | 2/2007 | Perkins et al. |
| 2007/0022755 A1 | 2/2007 | Pinkerton et al. |
| 2007/0062194 A1 | 3/2007 | Ingersoll |
| 2007/0074533 A1 | 4/2007 | Hugenroth et al. |
| 2007/0095069 A1 | 5/2007 | Joshi et al. |
| 2007/0113803 A1 | 5/2007 | Froloff et al. |
| 2007/0116572 A1 | 5/2007 | Barbu et al. |
| 2007/0137595 A1 | 6/2007 | Greenwell |
| 2007/0151528 A1 | 7/2007 | Hedman |
| 2007/0158946 A1 | 7/2007 | Annen et al. |
| 2007/0181199 A1 | 8/2007 | Weber |
| 2007/0182160 A1 | 8/2007 | Enis et al. |
| 2007/0205298 A1 | 9/2007 | Harrison et al. |
| 2007/0234749 A1 | 10/2007 | Enis et al. |
| 2007/0243066 A1 | 10/2007 | Baron |
| 2007/0245735 A1 | 10/2007 | Ashikian |
| 2007/0258834 A1 | 11/2007 | Froloff et al. |
| 2008/0000436 A1 | 1/2008 | Goldman |
| 2008/0016868 A1 | 1/2008 | Ochs et al. |
| 2008/0047272 A1 | 2/2008 | Schoell |
| 2008/0050234 A1 | 2/2008 | Ingersoll et al. |
| 2008/0072870 A1 | 3/2008 | Chomyszak et al. |
| 2008/0087165 A1 | 4/2008 | Wright et al. |
| 2008/0104939 A1 | 5/2008 | Hoffmann et al. |
| 2008/0112807 A1 | 5/2008 | Uphues et al. |
| 2008/0127632 A1 | 6/2008 | Finkenrath et al. |
| 2008/0138265 A1 | 6/2008 | Lackner et al. |
| 2008/0155975 A1 | 7/2008 | Brinkman |
| 2008/0155976 A1 | 7/2008 | Smith et al. |
| 2008/0157528 A1 | 7/2008 | Wang et al. |
| 2008/0157537 A1 | 7/2008 | Richard |
| 2008/0164449 A1 | 7/2008 | Gray et al. |
| 2008/0185194 A1 | 8/2008 | Leone |
| 2008/0202120 A1 | 8/2008 | Karyambas |
| 2008/0211230 A1 | 9/2008 | Gurin |
| 2008/0228323 A1 | 9/2008 | Laumer et al. |
| 2008/0233029 A1 | 9/2008 | Fan et al. |
| 2008/0238105 A1 | 10/2008 | Ortiz et al. |
| 2008/0238187 A1 | 10/2008 | Garnett et al. |
| 2008/0250788 A1 | 10/2008 | Nuel et al. |
| 2008/0251302 A1 | 10/2008 | Lynn et al. |
| 2008/0272597 A1 | 11/2008 | Althaus |
| 2008/0272598 A1 | 11/2008 | Nakhamkin |
| 2008/0272605 A1 | 11/2008 | Borden et al. |
| 2008/0308168 A1 | 12/2008 | O'Brien, II et al. |
| 2008/0308270 A1 | 12/2008 | Wilson |
| 2008/0315589 A1 | 12/2008 | Malmrup |
| 2009/0000290 A1 | 1/2009 | Brinkman |
| 2009/0007558 A1 | 1/2009 | Hall et al. |
| 2009/0008173 A1 | 1/2009 | Hall et al. |
| 2009/0010772 A1 | 1/2009 | Siemroth |
| 2009/0020275 A1 | 1/2009 | Neher et al. |
| 2009/0021012 A1 | 1/2009 | Stull et al. |
| 2009/0056331 A1 | 3/2009 | Zhao et al. |
| 2009/0071153 A1 | 3/2009 | Boyapati et al. |
| 2009/0107784 A1 | 4/2009 | Gabriel et al. |
| 2009/0145130 A1 | 6/2009 | Kaufman |
| 2009/0158740 A1 | 6/2009 | Littau et al. |
| 2009/0178409 A1 | 7/2009 | Shinnar |
| 2009/0200805 A1 | 8/2009 | Kim et al. |
| 2009/0220364 A1 | 9/2009 | Rigal et al. |
| 2009/0229902 A1 | 9/2009 | Stansbury, III |
| 2009/0249826 A1 | 10/2009 | Hugelman |
| 2009/0282822 A1 | 11/2009 | McBride et al. |
| 2009/0282840 A1 | 11/2009 | Chen et al. |
| 2009/0294096 A1 | 12/2009 | Mills et al. |
| 2009/0301089 A1 | 12/2009 | Bollinger |
| 2009/0317267 A1 | 12/2009 | Gill et al. |
| 2009/0322090 A1 | 12/2009 | Wolf |
| 2010/0018196 A1 | 1/2010 | Li et al. |
| 2010/0077765 A1 | 4/2010 | Japikse |
| 2010/0089063 A1 | 4/2010 | McBride et al. |
| 2010/0133903 A1 | 6/2010 | Rufer |
| 2010/0139277 A1 | 6/2010 | McBride et al. |
| 2010/0193270 A1 | 8/2010 | Deshaies et al. |
| 2010/0199652 A1 | 8/2010 | Lemofouet et al. |
| 2010/0205960 A1 | 8/2010 | McBride et al. |
| 2010/0229544 A1 | 9/2010 | Bollinger et al. |
| 2010/0257862 A1 | 10/2010 | Howes et al. |
| 2010/0307156 A1 | 12/2010 | Bollinger |
| 2010/0326062 A1 | 12/2010 | Fong et al. |
| 2010/0326064 A1 | 12/2010 | Fong et al. |
| 2010/0326066 A1 | 12/2010 | Fong et al. |
| 2010/0326068 A1 | 12/2010 | Fong et al. |
| 2010/0326069 A1 | 12/2010 | Fong et al. |
| 2010/0326075 A1 | 12/2010 | Fong et al. |
| 2010/0329891 A1 | 12/2010 | Fong et al. |
| 2010/0329903 A1 | 12/2010 | Fong et al. |
| 2010/0329909 A1 | 12/2010 | Fong et al. |
| 2011/0023488 A1 | 2/2011 | Fong et al. |
| 2011/0023977 A1 | 2/2011 | Fong et al. |
| 2011/0030359 A1 | 2/2011 | Fong et al. |
| 2011/0030552 A1 | 2/2011 | Fong et al. |
| 2011/0056193 A1 | 3/2011 | McBride et al. |
| 2011/0056368 A1 | 3/2011 | McBride et al. |
| 2011/0061741 A1 | 3/2011 | Ingersoll et al. |
| 2011/0061836 A1 | 3/2011 | Ingersoll et al. |
| 2011/0062166 A1 | 3/2011 | Ingersoll et al. |
| 2011/0106321 A1 | 5/2011 | Cherian et al. |
| 2011/0107755 A1 | 5/2011 | McBride et al. |
| 2011/0115223 A1 | 5/2011 | Stahlkopf et al. |
| 2011/0131966 A1 | 6/2011 | McBride et al. |
| 2011/0138797 A1 | 6/2011 | Bollinger et al. |
| 2011/0167813 A1 | 7/2011 | McBride et al. |
| 2011/0204064 A1 | 8/2011 | Crane et al. |
| 2011/0219760 A1 | 9/2011 | McBride et al. |

| | | | | | |
|---|---|---|---|---|---|
| 2011/0219763 A1 | 9/2011 | McBride et al. | DE | 19903907 | 8/2000 |
| 2011/0232281 A1 | 9/2011 | McBride et al. | DE | 19911534 | 9/2000 |
| 2011/0233934 A1 | 9/2011 | Crane et al. | DE | 10042020 | 5/2001 |
| 2011/0252777 A1 | 10/2011 | Bollinger et al. | DE | 20118183 | 3/2003 |
| 2011/0258996 A1 | 10/2011 | Ingersoll et al. | DE | 20120330 | 4/2003 |
| 2011/0258999 A1 | 10/2011 | Ingersoll et al. | DE | 10147940 | 5/2003 |
| 2011/0259001 A1 | 10/2011 | McBride et al. | DE | 10205733 | 8/2003 |
| 2011/0259442 A1 | 10/2011 | McBride et al. | DE | 10212480 | 10/2003 |
| 2011/0266810 A1 | 11/2011 | McBride et al. | DE | 20312293 | 12/2003 |
| 2011/0283690 A1 | 11/2011 | Bollinger et al. | DE | 10220499 | 4/2004 |
| 2011/0296821 A1 | 12/2011 | Bollinger et al. | DE | 10334637 | 2/2005 |
| 2011/0296822 A1 | 12/2011 | Bollinger et al. | DE | 10 2005 047622 | 4/2007 |
| 2011/0296823 A1 | 12/2011 | McBride et al. | EP | 0204748 | 3/1981 |
| 2011/0314800 A1 | 12/2011 | Fong et al. | EP | 0091801 | 10/1983 |
| 2011/0314804 A1 | 12/2011 | Fong et al. | EP | 0097002 | 12/1983 |
| 2012/0000557 A1 | 1/2012 | McBride et al. | EP | 0196690 | 10/1986 |
| 2012/0006013 A1 | 1/2012 | McBride et al. | EP | 0212692 | 3/1987 |
| 2012/0017580 A1 | 1/2012 | Fong et al. | EP | 0364106 | 4/1990 |
| 2012/0019009 A1 | 1/2012 | Fong et al. | EP | 0507395 | 10/1992 |
| 2012/0023919 A1 | 2/2012 | Fong et al. | EP | 0821162 | 1/1998 |
| 2012/0036851 A1 | 2/2012 | McBride et al. | EP | 0 857 877 | 8/1998 |
| 2012/0042772 A1 | 2/2012 | Fong et al. | EP | 1 388 442 | 2/2004 |
| 2012/0047884 A1 | 3/2012 | McBride et al. | EP | 1405662 | 4/2004 |
| 2012/0055146 A1 | 3/2012 | Baraga et al. | EP | 1657452 | 11/2004 |
| 2012/0057996 A1 | 3/2012 | Fong et al. | EP | 1726350 | 11/2006 |
| 2012/0057998 A1 | 3/2012 | Ingersoll et al. | EP | 1741899 | 1/2007 |
| 2012/0067036 A1 | 3/2012 | Fong et al. | EP | 1 780 058 | 5/2007 |
| 2012/0073432 A1 | 3/2012 | Ingersoll et al. | EP | 1988294 | 11/2008 |
| 2012/0085086 A1 | 4/2012 | Bollinger et al. | EP | 2014896 | 1/2009 |
| 2012/0090314 A1 | 4/2012 | Fong et al. | EP | 2078857 | 7/2009 |
| 2012/0096845 A1 | 4/2012 | Ingersoll et al. | FR | 2449805 | 9/1980 |
| 2012/0102935 A1 | 5/2012 | Ingersoll et al. | FR | 2816993 | 5/2002 |
| 2012/0102954 A1 | 5/2012 | Ingersoll et al. | FR | 2829805 | 3/2003 |
| 2012/0118137 A1 | 5/2012 | Fong et al. | GB | 722524 | 11/1951 |
| 2012/0119513 A1 | 5/2012 | McBride et al. | GB | 772703 | 4/1957 |
| 2012/0119514 A1 | 5/2012 | Crane et al. | GB | 1449076 | 9/1976 |
| 2012/0137668 A1 | 6/2012 | McBride et al. | GB | 1479940 | 7/1977 |
| 2012/0174569 A1 | 7/2012 | Ingersoll et al. | GB | 2106992 | 4/1983 |
| 2012/0197683 A1 | 8/2012 | Marcus | GB | 2223810 | 4/1990 |
| 2012/0210705 A1 | 8/2012 | McBride et al. | GB | 2 300 673 | 11/1996 |
| 2012/0222424 A1 | 9/2012 | Ingersoll et al. | GB | 2373546 | 9/2002 |
| 2012/0255292 A1 | 10/2012 | Fong et al. | GB | 2403356 | 12/2004 |
| 2012/0260645 A1 | 10/2012 | Fong et al. | JP | 57010778 | 1/1982 |
| 2012/0269651 A1 | 10/2012 | Fong et al. | JP | 57070970 | 5/1982 |
| 2012/0279209 A1 | 11/2012 | McBride et al. | JP | 57120058 | 7/1982 |
| 2012/0285154 A1 | 11/2012 | Bollinger et al. | JP | 58183880 | 10/1982 |
| 2012/0286522 A1 | 11/2012 | Stahlkopf et al. | JP | 58150079 | 9/1983 |
| 2012/0291989 A1 | 11/2012 | Fong et al. | JP | 58192976 | 11/1983 |
| 2012/0297772 A1 | 11/2012 | McBride et al. | JP | 60206985 | 10/1985 |
| 2012/0297776 A1 | 11/2012 | Bollinger et al. | JP | 62101900 | 5/1987 |
| 2012/0299310 A1 | 11/2012 | McBride et al. | JP | 63227973 | 9/1988 |
| 2013/0001958 A1 | 1/2013 | Crane et al. | JP | 2075674 | 3/1990 |
| 2013/0009408 A1 | 1/2013 | Crane et al. | JP | 2247469 | 10/1990 |
| 2013/0032743 A1 | 2/2013 | Fong et al. | JP | 3009090 | 1/1991 |
| | | | JP | 3281984 | 12/1991 |
| FOREIGN PATENT DOCUMENTS | | | JP | 4121424 | 4/1992 |
| CN | 1277323 | 12/2000 | JP | 6185450 | 7/1994 |
| CN | 1412443 | 4/2003 | JP | 8145488 | 6/1996 |
| CN | 1743665 | 3/2006 | JP | 9166079 | 6/1997 |
| CN | 2821162 | 9/2006 | JP | 10313547 | 11/1998 |
| CN | 2828319 | 10/2006 | JP | 2000-346093 | 6/1999 |
| CN | 2828368 | 10/2006 | JP | 11351125 | 12/1999 |
| CN | 1884822 | 12/2006 | JP | 2000166128 | 6/2000 |
| CN | 1888328 | 1/2007 | JP | 2000346093 | 12/2000 |
| CN | 1967091 | 5/2007 | JP | 2002127902 | 5/2002 |
| CN | 101033731 | 9/2007 | JP | 2003083230 | 3/2003 |
| CN | 101042115 | 9/2007 | JP | 2005023918 | 1/2005 |
| CN | 101070822 | 11/2007 | JP | 2005036769 | 2/2005 |
| CN | 101149002 | 3/2008 | JP | 2005068963 | 3/2005 |
| CN | 101162073 | 4/2008 | JP | 2006220252 | 8/2006 |
| CN | 201103518 | 8/2008 | JP | 2007001872 | 1/2007 |
| CN | 201106527 | 8/2008 | JP | 2007145251 | 6/2007 |
| CN | 101289963 | 10/2008 | JP | 2007211730 | 8/2007 |
| CN | 201125855 | 10/2008 | JP | 2008038658 | 2/2008 |
| CN | 101377190 | 4/2009 | KR | 840000180 | 2/1984 |
| CN | 101408213 | 4/2009 | KR | 2004004637 | 1/2004 |
| CN | 101435451 | 5/2009 | RU | 2101562 | 1/1998 |
| DE | 25 38 870 | 6/1977 | RU | 2169857 | 6/2001 |
| DE | 19530253 | 11/1996 | RU | 2213255 | 9/2003 |

| | | |
|---|---|---|
| SU | 800438 | 1/1981 |
| UA | 69030 | 8/2004 |
| WO | WO-82/00319 | 2/1982 |
| WO | WO-8802818 | 4/1988 |
| WO | WO-99/41498 | 8/1990 |
| WO | WO-92/22741 | 12/1992 |
| WO | WO-93/06367 | 4/1993 |
| WO | WO-93/11363 | 6/1993 |
| WO | WO-93/24754 | 12/1993 |
| WO | WO 9412785 | 6/1994 |
| WO | WO-95/25381 | 9/1995 |
| WO | WO-96/01942 | 1/1996 |
| WO | WO-96/22456 | 7/1996 |
| WO | WO-96/34213 | 10/1996 |
| WO | WO-97/01029 | 1/1997 |
| WO | WO-97/17546 | 5/1997 |
| WO | WO-98/02818 | 1/1998 |
| WO | WO-98/17492 | 4/1998 |
| WO | WO-00/01945 | 1/2000 |
| WO | WO-00/37800 | 6/2000 |
| WO | WO-00/65212 | 11/2000 |
| WO | WO-00/68578 | 11/2000 |
| WO | WO 0175290 | 10/2001 |
| WO | WO-0175308 | 10/2001 |
| WO | WO-02/25083 | 3/2002 |
| WO | WO-02/46621 | 6/2002 |
| WO | WO-02/103200 | 12/2002 |
| WO | WO-03/021702 | 3/2003 |
| WO | WO-03021107 | 3/2003 |
| WO | WO-03/078812 | 9/2003 |
| WO | WO-03/081011 | 10/2003 |
| WO | WO-2004/034391 | 5/2004 |
| WO | WO-2004/059155 | 7/2004 |
| WO | WO-2004/072452 | 8/2004 |
| WO | WO-2004/074679 | 9/2004 |
| WO | WO-2004/109172 | 12/2004 |
| WO | WO-2005/044424 | 5/2005 |
| WO | WO-2005/062969 | 7/2005 |
| WO | WO-2005/067373 | 7/2005 |
| WO | WO-2005/079461 | 9/2005 |
| WO | WO-2005/088131 | 9/2005 |
| WO | WO-2005/095155 | 10/2005 |
| WO | WO-2006/029633 | 3/2006 |
| WO | WO-2006/058085 | 6/2006 |
| WO | WO-2006/124006 | 11/2006 |
| WO | WO-2007/002094 | 1/2007 |
| WO | WO-2007/003954 | 1/2007 |
| WO | WO-2007/012143 | 2/2007 |
| WO | WO-2007/035997 | 4/2007 |
| WO | WO-2007/051034 | 5/2007 |
| WO | WO-2007/066117 | 6/2007 |
| WO | WO-2007/086792 | 8/2007 |
| WO | WO-2007/089872 | 8/2007 |
| WO | WO-2007/096656 | 8/2007 |
| WO | WO-2007/111839 | 10/2007 |
| WO | WO-2007/136765 | 11/2007 |
| WO | WO-2007/140914 | 12/2007 |
| WO | WO-2008/003950 | 1/2008 |
| WO | WO-2008/014769 | 2/2008 |
| WO | WO-2008023901 | 2/2008 |
| WO | WO-2008/027259 | 3/2008 |
| WO | WO-2008/028881 | 3/2008 |
| WO | WO-2008/039725 | 4/2008 |
| WO | WO-2008/045468 | 4/2008 |
| WO | WO-2008/051427 | 5/2008 |
| WO | WO-2008/074075 | 6/2008 |
| WO | WO-2008/084507 | 7/2008 |
| WO | WO-2008/091373 | 7/2008 |
| WO | WO 2008102292 | 8/2008 |
| WO | WO-2008/106967 | 9/2008 |
| WO | WO-2008/108870 | 9/2008 |
| WO | WO-2008/109006 | 9/2008 |
| WO | WO-2008/110018 | 9/2008 |
| WO | WO-2008/115479 | 9/2008 |
| WO | WO-2008/121378 | 10/2008 |
| WO | WO-2008139267 | 11/2008 |
| WO | WO-2008/152432 | 12/2008 |
| WO | WO-2008/153591 | 12/2008 |
| WO | WO-2008/157327 | 12/2008 |
| WO | WO-2009/034421 | 3/2009 |
| WO | WO-2009/034548 | 3/2009 |
| WO | WO-2009/038973 | 3/2009 |
| WO | WO-2009/044139 | 4/2009 |
| WO | WO-2009/045110 | 4/2009 |
| WO | WO-2009045468 | 4/2009 |
| WO | WO-2009/114205 | 9/2009 |
| WO | WO-2009/126784 | 10/2009 |
| WO | WO-2010/006319 | 1/2010 |
| WO | WO-2010/009053 | 1/2010 |
| WO | WO-2010/040890 | 4/2010 |
| WO | WO-2010/105155 | 9/2010 |
| WO | WO-2010/135658 | 11/2010 |
| WO | WO-2011/008321 | 1/2011 |
| WO | WO-2011/008325 | 1/2011 |
| WO | WO-2011/008500 | 1/2011 |
| WO | WO-2011/079267 | 6/2011 |
| WO | WO-2011/079271 | 6/2011 |

OTHER PUBLICATIONS

Lemofouet, "Investigation and Optimisation of Hybrid Electricity Storage Systems Based on Compressed Air and Supercapacitors," (Oct. 20, 2006), 250 pages.

Cyphelly et al., "Usage of Compressed Air Storage Systems," BFE-Program "Electricity," Final Report, May 2004, 14 pages.

Lemofouet et al., "A Hybrid Energy Storage System Based on Compressed Air and Supercapacitors with Maximum Efficiency Point Tracking (MEPT)," IEEE Transactions on Industrial Electron, vol. 53, No. 4, (Aug. 2006) pp. 1105-1115.

International Search Report and Written Opinion issued Sep. 15, 2009 for International Application No. PCT/US2009/040027, 8 pages.

International Search Report and Written Opinion issued Aug. 30, 2010 for International Application No. PCT/US2010/029795, 9 pages.

International Search Report and Written Opinion issued Dec. 3, 2009 for International Application No. PCT/US2009/046725, 9 pages.

International Search Report and Written Opinion issued Jan. 4, 2011 for International Application No. PCT/US2010/055279, 13 pages.

International Search Report and Written Opinion mailed May 25, 2011 for International Application No. PCT/US2010/027138, 12 pages.

Rufer et al., "Energetic Performance of a Hybrid Energy Storage System Based on Compressed Air and Super Capacitors," Power Electronics, Electrical Drives, Automation and Motion, (May 1, 2006), pp. 469-474.

Lemofouet et al. "Hybrid Energy Storage Systems based on Compressed Air and Supercapacitors with Maximum Efficiency Point Tracking," Industrial Electronics Laboratory (LEI), (2005), pp. 1-10.

Lemofouet et al. "Hybrid Energy Storage Systems based on Compressed Air and Supercapacitors with Maximum Efficiency Point Tracking," The International Power Electronics Conference, (2005), pp. 461-468.

International Preliminary Report on Patentability mailed Oct. 13, 2011 for International Application No. PCT/US2010/029795 (9 pages).

Stephenson et al., "Computer Modelling of Isothermal Compression in the Reciprocating Compressor of a Complete Isoengine," 9th International Conference on Liquid Atomization and Spray Systems (Jul. 13-17, 2003).

Coney et al., "Development of a Reciprocating Compressor Using Water Injection to Achieve Quasi-Isothermal Compression," Purdue University International Compressor Engineering Conference (2002).

Linnemann et al., "The isoengine—A Novel High Efficiency Engine with Optional Compressed Air Energy Storage (CAES)," International Joint Power Generation Conference (Jun. 16-19, 2003).

Linnemann et al., "The Isoengine: Realisation of a High-Efficiency Power Cycle Based on Isothermal Compression," Int. J. Energy 'Tech. and Policy, vol. 3, Nos. 1-2, pp. 66-84 (2005).

Winterburn et al., "Mechanisms of Ultrasound Foam Interactions," Asia-Pact J. Chem. Eng., vol. 4, pp. 184-190 (2009).

* cited by examiner

ENERGY STORAGE AND RECOVERY UTILIZING LOW-PRESSURE THERMAL CONDITIONING FOR HEAT EXCHANGE WITH HIGH-PRESSURE GAS

RELATED APPLICATION

This application claims the benefit of and priority to U.S. Provisional Patent Application No. 61/375,402, filed Aug. 20, 2010, the entire disclosure of which is hereby incorporated herein by reference.

STATEMENT REGARDING FEDERALLY SPONSORED RESEARCH

This invention was made with government support under IIP-0923633 awarded by the NSF and DE-OE0000231 awarded by the DOE. The government has certain rights in the invention.

FIELD OF THE INVENTION

In various embodiments, the present invention relates to pneumatics, power generation, and energy storage, and more particularly, to compressed-gas energy-storage systems and methods using pneumatic or pneumatic/hydraulic cylinders.

BACKGROUND

Storing energy in the form of compressed gas has a long history and components tend to be well tested and reliable, and have long lifetimes. The general principle of compressed-gas or compressed-air energy storage (CAES) is that generated energy (e.g., electric energy) is used to compress gas (e.g., air), thus converting the original energy to pressure potential energy; this potential energy is later recovered in a useful form (e.g., converted back to electricity) via gas expansion coupled to an appropriate mechanism. Advantages of compressed-gas energy storage include low specific-energy costs, long lifetime, low maintenance, reasonable energy density, and good reliability.

If a body of gas is at the same temperature as its environment, and expansion occurs slowly relative to the rate of heat exchange between the gas and its environment, then the gas will remain at approximately constant temperature as it expands. This process is termed "isothermal" expansion. Isothermal expansion of a quantity of high-pressure gas stored at a given temperature recovers approximately three times more work than would "adiabatic expansion," that is, expansion where no heat is exchanged between the gas and its environment—e.g., because the expansion happens rapidly or in an insulated chamber. Gas may also be compressed isothermally or adiabatically.

An ideally isothermal energy-storage cycle of compression, storage, and expansion would have 100% thermodynamic efficiency. An ideally adiabatic energy-storage cycle would also have 100% thermodynamic efficiency, but there are many practical disadvantages to the adiabatic approach. These include the production of higher temperature and pressure extremes within the system, heat loss during the storage period, and inability to exploit environmental (e.g., cogenerative) heat sources and sinks during expansion and compression, respectively. In an isothermal system, the cost of adding a heat-exchange system is traded against resolving the difficulties of the adiabatic approach. In either case, mechanical energy from expanding gas must usually be converted to electrical energy before use.

An efficient and novel design for storing energy in the form of compressed gas utilizing near isothermal gas compression and expansion has been shown and described in U.S. Pat. No. 7,832,207 (the '207 patent) and U.S. patent application Ser. No. 12/639,703 (the '703 application), the disclosures of which are hereby incorporated herein by reference in their entireties. The '207 patent and the '703 application disclose systems and methods for expanding gas isothermally in staged cylinders and intensifiers over a large pressure range in order to generate electrical energy when required. Mechanical energy from the expanding gas may be used to drive a hydraulic pump/motor subsystem that produces electricity. Systems and methods for hydraulic-pneumatic pressure intensification that may be employed in systems and methods such as those disclosed in the '207 patent and the '703 application are shown and described in U.S. patent application Ser. No. 12/879,595 (the '595 application), the disclosure of which is hereby incorporated herein by reference in its entirety.

In the systems disclosed in the '207 patent and the '703 application, reciprocal mechanical motion is produced during recovery of energy from storage by expansion of gas in the cylinders. This reciprocal motion may be converted to electricity by a variety of means, for example as disclosed in the '595 application as well as in U.S. patent application Ser. No. 12/938,853 (the '853 application), the disclosure of which is hereby incorporated herein by reference in its entirety. The ability of such systems to either store energy (i.e., use energy to compress gas into a storage reservoir) or produce energy (i.e., expand gas from a storage reservoir to release energy) will be apparent to any person reasonably familiar with the principles of electrical and pneumatic machines.

Gas undergoing expansion tends to cool, while gas undergoing compression tends to heat. To maximize efficiency (i.e., the fraction of elastic potential energy in the compressed gas that is converted to work, or vice versa), gas expansion and compression should be as near isothermal (i.e., constant-temperature) as possible. Several techniques of approximating isothermal expansion and compression may be employed.

First, as described in U.S. Pat. No. 7,802,426 (the '426 patent), the disclosure of which is hereby incorporated by reference herein in its entirety, gas undergoing either compression or expansion may be directed, continuously or in installments, through a heat-exchange subsystem external to the cylinder. The heat-exchange subsystem either rejects heat to the environment (to cool gas undergoing compression) or absorbs heat from the environment (to warm gas undergoing expansion). An isothermal process may be approximated via judicious selection of this heat-exchange rate.

Additionally, as described in the '703 application, droplets of a liquid (e.g., water) may be sprayed into a chamber of the cylinder in which gas is presently undergoing compression (or expansion) in order to transfer heat to or from the gas. As the liquid droplets exchange heat with the gas around them, the temperature of the gas is raised or lowered; the temperature of the droplets is also raised or lowered. The liquid is evacuated from the cylinder through a suitable mechanism. The heat-exchange spray droplets may be introduced through a spray head (in, e.g., a vertical cylinder), through a spray rod arranged coaxially with the cylinder piston (in, e.g., a horizontal cylinder), or by any other mechanism that permits formation of a liquid spay within the cylinder. Droplets may be used to either warm gas undergoing expansion or to cool gas undergoing compression. Again, an isothermal process may be approximated via judicious selection of this heat-exchange rate.

An efficient and novel design for the energy-efficient pumping of liquid for the production of liquid sprays used to approximate isothermal expansion and compression inside cylinders or inside other mechanical devices for expanding or compressing gas, as disclosed in the '703 application, has been shown and described in U.S. patent application Ser. No. 13/009,409, filed Jan. 19, 2011 (the '409 application), the entire disclosure of which is incorporated herein. As disclosed in the '409 application, energy-efficient circulation of the heat-exchange liquid through the gas presently undergoing compression or expansion, which during some portion of either compression or expansion is at high pressure (e.g., 3,000 psi), is achieved by circulating the heat-exchange liquid itself at high pressure. This removes any need to raise the pressure of the heat-exchange liquid from atmospheric pressure, which generally increases energy consumption.

During the continuous energy-efficient circulation of a heat-exchange liquid for the purpose of cooling gas undergoing compression as disclosed in the '409 application, the heat-exchange liquid removes heat from the gas and therefore increases in temperature. As the temperature of the heat-exchange liquid increases, the heat-exchange liquid tends to become less capable of removing heat from the gas: if the heat exchange liquid reaches thermal equilibrium with (i.e., becomes the same temperature as) the gas being cooled, heat will cease to be exchanged between the liquid and gas. It is therefore preferable to keep the heat-exchange liquid at a temperature significantly lower than that of the gas undergoing compression.

Similarly, during the continuous energy-efficient circulation of a heat-exchange liquid for the purpose of heating gas undergoing expansion as disclosed in the '409 application, the heat-exchange liquid transfers heat to the gas and therefore becomes cooler. As it cools, the heat-exchange liquid tends to become less capable of transferring heat to the gas: if the heat-exchange liquid reaches thermal equilibrium with the gas being heated, no heat will be exchanged. It is therefore preferable to keep the heat-exchange liquid at a temperature higher than that of the gas undergoing expansion. In other words, there is a need to manage the temperature of the heat-exchange liquid itself, which is at high pressure during at least part of each isothermal compression or expansion cycle.

As detailed above, systems utilizing liquid-spray heat exchange tend to circulate heat-exchange fluid at high pressures (e.g., 3000 pounds per square inch (psi)) through a high-pressure heat exchanger capable of and configured for the circulation of high-pressure liquid. Such high-pressure heat exchangers are generally heavier, larger, more expensive, and more complex than low-pressure heat exchangers of equivalent capacity (i.e., heat-exchange capacity, e.g., in joules/sec) that circulate heat-exchange fluid at significantly lower pressures (e.g., approximately atmospheric pressure). Thus, there is a need for techniques for making low-pressure heat exchange compatible with high-pressure compressed-gas energy storage and recovery.

SUMMARY

Embodiments of the invention add heat (i.e., thermal energy) to, or remove heat from, a high-pressure gas in a pneumatic or pneumatic/hydraulic cylinder by passing only relatively low-pressure fluids through a heat exchanger or fluid reservoir. Embodiments include various systems and techniques for the management of the temperature of a heat-exchange liquid in a system employing one or more cylinders for the expansion or compression of gas. First, in a system employing at least one cylinder and efficiently circulating a heat-exchange liquid through the gas undergoing compression or expansion (e.g., as disclosed in the '409 application), two or more reservoirs of heat-exchange liquid may be maintained, at least one reservoir being at low (e.g., approximately atmospheric) pressure at any given time. Each reservoir preferably contains at least enough heat-exchange fluid to meet the heat-exchange needs of a single expansion or compression stroke of the cylinder. The contents of the low-pressure reservoir may be passed through a heat exchanger or open external liquid reservoir while the contents of another reservoir are circulated through gas undergoing compression or expansion. At the commencement of the next stroke, the low-pressure reservoir is then available at a controlled temperature for circulation through the cylinder. The reservoirs may each contain portions of a single heat-exchange fluid, or two or more of the reservoirs may each contain a different heat-exchange fluid.

In additional embodiments, the heat-exchange liquid may be circulated directly through a body of gas undergoing compression or expansion while the pressure of the gas is above a certain threshold: whenever the pressure of the gas is below that threshold (e.g., later in an expansion stroke or earlier in a compression stroke), the heat-exchange liquid is circulated both through the body of gas undergoing compression or expansion and through a low-pressure heat exchanger or open external liquid reservoir. The heat-exchange liquid's temperature is thus not externally controlled (i.e., externally conditioned) during the high-pressure fraction of each stroke, and controlled only during the low-pressure fraction of the stroke.

In yet additional embodiments, a two-chamber, free-piston hydraulic cylinder operated by a linear actuator or equivalent mechanism may be employed as a pump to circulate heat-exchange liquid efficiently through the gas undergoing compression or expansion. During the return (inactive) stroke of the cylinder, during which gas is neither compressed nor expanded in the cylinder, the piston of the pump also performs a return stroke. The pump's return stroke circulates the heat-exchange liquid at low pressure through a heat exchanger or open external liquid reservoir. The temperature of the heat-exchange liquid is thus raised or lowered, as desired, between active expansion or compression strokes of the cylinder.

Embodiments of the present invention are typically utilized in energy storage and generation systems utilizing compressed gas. In a compressed-gas energy storage system, gas is stored at high pressure (e.g., approximately 3,000 psi). This gas may be expanded into a cylinder having a first compartment (or "chamber") and a second compartment separated by a piston slidably disposed within the cylinder (or by another boundary mechanism). A shaft may be coupled to the piston and extend through the first compartment and/or the second compartment of the cylinder and beyond an end cap of the cylinder, and a transmission mechanism may be coupled to the shaft for converting a reciprocal motion of the shaft into a rotary motion, as described in the '595 and '853 applications. Moreover, a motor/generator may be coupled to the transmission mechanism. Alternatively or additionally, the shaft of the cylinders may be coupled to one or more linear generators, as described in the '853 application.

As also described in the '853 application, the range of forces produced by expanding a given quantity of gas in a given time may be reduced through the addition of multiple, series-connected cylinder stages. That is, as gas from a high-pressure reservoir is expanded in one chamber of a first, high-pressure cylinder, gas from the other chamber of the first cylinder is directed to the expansion chamber of a second, lower-pressure cylinder. Gas from the lower-pressure chamber of this second cylinder may either be vented to the environment or directed to the expansion chamber of a third cylinder operating at still lower pressure; the third cylinder may be similarly connected to a fourth cylinder; and so on.

The principle may be extended to more than two cylinders to suit particular applications. For example, a narrower output force range for a given range of reservoir pressures is achieved by having a first, high-pressure cylinder operating between, for example, approximately 3,000 psig and approximately 300 psig and a second, larger-volume, lower-pressure cylinder operating between, for example, approximately 300 psig and approximately 30 psig. When two expansion cylinders are used, the range of pressure within either cylinder (and thus the range of force produced by either cylinder) is reduced as the square root relative to the range of pressure (or force) experienced with a single expansion cylinder, e.g., from approximately 100:1 to approximately 10:1 (as set forth in the '853 application). Furthermore, as set forth in the '595 application, N appropriately sized cylinders can reduce an original operating pressure range R to $R^{1/N}$. Any group of N cylinders staged in this manner, where N≧2, is herein termed a cylinder group.

All of the approaches described above for converting potential energy in compressed gas into mechanical and electrical energy may, if appropriately designed, be operated in reverse to store electrical energy as potential energy in a compressed gas. Since the accuracy of this statement will be apparent to any person reasonably familiar with the principles of electrical machines, power electronics, pneumatics, and the principles of thermodynamics, the operation of these mechanisms to both store energy and recover it from storage will not be described for each embodiment. Such operation is, however, contemplated and within the scope of the invention and may be straightforwardly realized without undue experimentation.

The systems described herein, and/or other embodiments employing liquid-spray heat exchange or external gas heat exchange, may draw or deliver thermal energy via their heat-exchange mechanisms to external systems (not shown) for purposes of cogeneration, as described in U.S. Pat. No. 7,958,731, filed Jan. 20, 2010 (the '731 patent), the entire disclosure of which is incorporated by reference herein.

The compressed-air energy storage and recovery systems described herein are preferably "open-air" systems, i.e., systems that take in air from the ambient atmosphere for compression and vent air back to the ambient after expansion, rather than systems that compress and expand a captured volume of gas in a sealed container (i.e., "closed-air" systems). Thus, the systems described herein generally feature one or more cylinder assemblies for the storage and recovery of energy via compression and expansion of gas. The systems also include (i) a reservoir for storage of compressed gas after compression and supply of compressed gas for expansion thereof, and (ii) a vent for exhausting expanded gas to atmosphere after expansion and supply of gas for compression. The storage reservoir may include or consist essentially of, e.g., one or more one or more pressure vessels (i.e., containers for compressed gas that may have rigid exteriors or may be inflatable, and that may be formed of various suitable materials such as metal or plastic) or caverns (i.e., naturally occurring or artificially created cavities that are typically located underground). Open-air systems typically provide superior energy density relative to closed-air systems.

Furthermore, the systems described herein may be advantageously utilized to harness and recover sources of renewable energy, e.g., wind and solar energy. For example, energy stored during compression of the gas may originate from an intermittent renewable energy source of, e.g., wind or solar energy, and energy may be recovered via expansion of the gas when the intermittent renewable energy source is nonfunctional (i.e., either not producing harnessable energy or producing energy at lower-than-nominal levels). As such, the systems described herein may be connected to, e.g., solar panels or wind turbines, in order to store the renewable energy generated by such systems.

In one aspect, embodiments of the invention feature a method of energy storage and recovery including or consisting essentially of, during each of a plurality of cycles, (i) compressing a gas within a first pressure range to store energy and/or (ii) expanding a gas within a first pressure range to recover energy. During a first cycle, (i) at least a portion of a first heat-exchange fluid is circulated, without thermal conditioning thereof, through the gas to exchange heat between the gas and the first heat-exchange fluid, and (ii) at least a portion of a second heat-exchange fluid is thermally conditioned, external to the compression and/or expansion, at a pressure lower than the first pressure range. During a second cycle, (i) at least a portion of the second heat-exchange fluid is circulated, without thermal conditioning thereof, through the gas to exchange heat between the gas and the second heat-exchange fluid, and (ii) at least a portion of the first heat-exchange fluid is thermally conditioned, external to the at least one of compression or expansion, at a pressure lower than the first pressure range.

Embodiments of the invention may include one or more of the following in any of a variety of combinations. Exchanging heat between the gas and the first heat-exchange fluid and/or exchanging heat between the gas and the second heat-exchange fluid may include or consist essentially of maintaining the gas at a substantially constant temperature. The first and second heat-exchange fluids may each be circulated from a discrete reservoir. Each reservoir may be sized to contain a sufficient quantity of the first or second heat-exchange fluid for at least one cycle of compression or expansion. The gas may be compressed or expanded within a chamber of a cylinder alternately fluidly connected to one of the discrete reservoirs. Circulating the at least a portion of the first heat-exchange fluid through the gas may include or consist essentially of spraying the first heat-exchange fluid into the chamber. Circulating the at least a portion of the second heat-exchange fluid through the gas may include or consist essentially of spraying the second heat-exchange fluid into the chamber. The pressure at which the first heat-exchange fluid is externally conditioned and/or the pressure at which the second heat-exchange fluid is externally conditioned may be approximately atmospheric pressure. The first pressure range may be approximately 300 psig to approximately 3000 psig.

Thermal conditioning external to the compression and/or expansion may include or consist essentially of heat exchange in a heat exchanger (e.g., a plate-type heat exchanger) and/or an external reservoir. Expanded gas may be vented to atmosphere. Compressed gas may be stored in a compressed-gas reservoir. Energy stored during compression of the gas may originate from an intermittent renewable energy source (e.g., of wind or solar energy), and gas may be expanded to recover energy when the intermittent renewable energy source is nonfunctional. Each of the first and second heat-exchange fluids may be a portion of a single heat-exchange fluid, or the first and second heat-exchange fluids may be different from each other.

In another aspect, embodiments of the invention feature a compressed gas energy storage and recovery system including or consisting essentially of a cylinder assembly for compressing gas to store energy and/or expanding gas to recover energy and a heat-exchange subsystem in fluid communication with the cylinder assembly. The heat-exchange subsystem includes or consists essentially of a plurality of reservoirs for containing a heat-exchange fluid and a heat exchanger for thermally conditioning the heat-exchange fluid outside of the cylinder assembly. Each reservoir is alternately fluidly connectable to the cylinder assembly and to the heat exchanger.

Embodiments of the invention may include one or more of the following in any of a variety of combinations. The cylinder assembly may include or consist essentially of two chambers and a boundary mechanism (e.g., a movable mechanical boundary mechanism such as a piston) separating the two chambers. The heat-exchange subsystem may include a mechanism (e.g., a spray mechanism such as a spray head and/or a spray rod) for introducing the heat-exchange fluid into the cylinder assembly. The cylinder assembly may compress or expand gas over a first pressure range, and the heat exchanger may thermally condition the heat-exchange fluid at a pressure less than the maximum pressure of the first pressure range. The heat exchanger may thermally condition the heat-exchange fluid at approximately atmospheric pressure. A compressed-gas reservoir for storage of gas after compression and/or supply of compressed gas for expansion thereof may be selectively fluidly connected to the cylinder assembly. A vent for exhausting expanded gas to atmosphere and/or supply of gas for compression thereof may be selectively fluidly connected to the cylinder assembly. An intermittent renewable energy source (e.g., of wind or solar energy) may be connected to the cylinder assembly. Energy stored during compression of the gas may originate from the intermittent renewable energy source and/or energy may be recovered via expansion of the gas when the intermittent renewable energy source is nonfunctional.

In yet another aspect, embodiments of the invention feature a method of energy storage and recovery including or consisting essentially of compressing a gas to store energy and/or expanding a gas to recover energy, as well as circulating a heat-exchange fluid through the gas to exchange heat between the gas and the heat-exchange fluid. The heat-exchange fluid is circulated without thermally conditioning thereof when a pressure of the gas is greater than a threshold pressure, and the heat-exchange fluid is thermally conditioned, external to the compression and/or expansion, when the pressure of the gas is less than or equal to the threshold pressure.

Embodiments of the invention may include one or more of the following in any of a variety of combinations. Exchanging heat between the gas and the heat-exchange fluid may include or consist essentially of maintaining the gas at a substantially constant temperature. The threshold pressure may be approximately 300 psig, approximately 500 psig, or even approximately 1000 psig. The threshold pressure may be approximately 10% of the maximum pressure of compression or expansion. The threshold pressure may be equal to or less than the maximum operating pressure of a heat exchanger in which the heat-exchange fluid is thermally conditioned. (Such maximum operating pressure of the heat exchanger may be based on, e.g., the infinite fatigue lifetime of the heat exchanger.) The gas may be compressed or expanded within a chamber of a cylinder. Circulating heat-exchange fluid through the gas may include or consist essentially of spraying the heat-exchange fluid into the chamber. Thermal conditioning of the heat-exchange fluid may include or consist essentially of heat exchange in a heat exchanger (e.g., a plate-type heat exchanger) and/or an external reservoir. Expanded gas may be vented to atmosphere. Compressed gas may be stored in a compressed-gas reservoir. Energy stored during compression of the gas may originate from an intermittent renewable energy source (e.g., of wind or solar energy), and gas may be expanded to recover energy when the intermittent renewable energy source is nonfunctional.

In a further aspect, embodiments of the invention feature a compressed gas energy storage and recovery system including or consisting essentially of a cylinder assembly for compressing gas to store energy and/or expanding gas to recover energy and a heat-exchange subsystem in fluid communication with the cylinder assembly. The heat-exchange subsystem includes or consists essentially of a heat exchanger for thermally conditioning a heat-exchange fluid outside of the cylinder assembly and a connection mechanism for fluidly connecting the cylinder assembly and the heat exchanger only when the pressure in the cylinder assembly is less than or equal to a threshold pressure.

Embodiments of the invention may include one or more of the following in any of a variety of combinations. The cylinder assembly may include or consist essentially of two chambers and a boundary mechanism (e.g., a movable mechanical boundary mechanism such as a piston) separating the two chambers. The heat-exchange subsystem may include a mechanism (e.g., a spray mechanism such as a spray head and/or a spray rod) for introducing the heat-exchange fluid into the cylinder assembly. The connection mechanism may include or consist essentially of a valve assembly. A compressed-gas reservoir for storage of gas after compression and/or supply of compressed gas for expansion thereof may be selectively fluidly connected to the cylinder assembly. A vent for exhausting expanded gas to atmosphere and/or supply of gas for compression thereof may be selectively fluidly connected to the cylinder assembly. An intermittent renewable energy source (e.g., of wind or solar energy) may be connected to the cylinder assembly. Energy stored during compression of the gas may originate from the intermittent renewable energy source and/or energy may be recovered via expansion of the gas when the intermittent renewable energy source is nonfunctional.

In yet a further aspect, embodiments of the invention feature a method of energy storage and recovery including or consisting essentially of, during each of a plurality of cycles, compressing a gas to store energy and/or expanding a gas to recover energy and circulating, without thermal conditioning thereof, a heat-exchange fluid through the gas to exchange heat between the gas and the heat-exchange fluid. Between cycles, at least a portion of the heat-exchange fluid is thermally conditioned external to the compression and/or expansion.

Embodiments of the invention may include one or more of the following in any of a variety of combinations. The at least a portion of the heat-exchange fluid may be thermally conditioned only between cycles. The at least a portion of the heat-exchange fluid may be thermally conditioned between cycles at a pressure lower than a pressure of the compression and/or expansion, e.g., at approximately atmospheric pressure. Exchanging heat between the gas and the heat-exchange fluid may include or consist essentially of maintaining the gas at a substantially constant temperature. The gas may be compressed or expanded within a chamber of a cylinder. Circulating heat-exchange fluid through the gas may include or consist essentially of spraying the heat-exchange fluid into the chamber. During each cycle, circulating the heat-exchange fluid may include or consist essentially of pumping heat-exchange fluid into a first chamber of a hydraulic cylinder and pumping heat-exchange fluid out of a second chamber of the hydraulic cylinder separated from the first chamber.

The first and second chambers may be separated by a boundary mechanism (e.g., a moveable mechanical boundary mechanism such as a piston). Each of the first and second chambers may be sized to contain sufficient heat-exchange fluid for at least one cycle of compression or expansion. Thermally conditioning the heat-exchange fluid may include or consist essentially of pumping heat-exchange fluid from a first chamber of a hydraulic cylinder through a heat exchanger (e.g., a plate-type heat exchanger) or an external reservoir and into a second chamber of the hydraulic cylinder separated from the first chamber. The first and second chambers may be separated by a boundary mechanism (e.g., a moveable mechanical boundary mechanism such as a piston). Expanded gas may be vented to atmosphere. Compressed gas may be stored in a compressed-gas reservoir. Energy stored during compression of the gas may originate from an intermittent renewable energy source (e.g., of wind or solar energy), and gas may be expanded to recover energy when the intermittent renewable energy source is nonfunctional.

In an additional aspect, embodiments of the invention feature a compressed gas energy storage and recovery system including or consisting essentially of a cylinder assembly for compressing gas to store energy and/or expanding gas to recover energy and a heat-exchange subsystem in fluid communication with the cylinder assembly. The heat-exchange subsystem includes or consists essentially of (i) for containing a heat-exchange fluid, a hydraulic cylinder having first and second ends separately fluidly connectable to the cylinder assembly and (ii) a heat exchanger for thermally conditioning the heat-exchange fluid outside of the cylinder assembly. The heat exchanger is fluidly connected to the first and second ends of the hydraulic cylinder only between cycles of gas compression or gas expansion.

Embodiments of the invention may include one or more of the following in any of a variety of combinations. The cylinder assembly may include or consist essentially of two chambers and a boundary mechanism (e.g., a movable mechanical boundary mechanism) separating the two chambers. The heat-exchange subsystem may include a mechanism (e.g., a spray mechanism such as a spray head and/or a spray rod) for introducing the heat-exchange fluid into the cylinder assembly during gas compression and/or gas expansion. The hydraulic cylinder may include a boundary mechanism (e.g., a movable mechanical boundary mechanism such as a piston) separating the first and second ends. A compressed-gas reservoir for storage of gas after compression and/or supply of compressed gas for expansion thereof may be selectively fluidly connected to the cylinder assembly. A vent for exhausting expanded gas to atmosphere and/or supply of gas for compression thereof may be selectively fluidly connected to the cylinder assembly. An intermittent renewable energy source (e.g., of wind or solar energy) may be connected to the cylinder assembly. Energy stored during compression of the gas may originate from the intermittent renewable energy source and/or energy may be recovered via expansion of the gas when the intermittent renewable energy source is nonfunctional.

In another aspect, embodiments of the invention feature a method of energy storage and recovery including or consisting essentially of compressing gas at a high pressure to store energy and/or expanding a gas at a high pressure to recover energy, circulating a heat-exchange fluid through the gas to exchange heat between the gas and the heat-exchange fluid, and, external to the compression and/or expansion, thermally conditioning the heat-exchange fluid at a low pressure without thermally conditioning the heat-exchange fluid at the high pressure. The high pressure is at least ten times the low pressure (e.g., measured in psig).

Embodiments of the invention may include one or more of the following in any of a variety of combinations. The high pressure may be at least twenty times, or even at least one hundred times, the low pressure. The low pressure may be approximately atmospheric pressure. The high pressure may be greater than or approximately equal to 300 psig, or even 3000 psig. Exchanging heat between the gas and the heat-exchange fluid may include or consist essentially of maintaining the gas at a substantially constant temperature. The gas may be compressed or expanded within a chamber of a cylinder. Circulating heat-exchange fluid through the gas may include or consist essentially of spraying the heat-exchange fluid into the chamber. Thermally conditioning the heat-exchange fluid may include or consist essentially of heat exchange in a heat exchanger (e.g., a plate-type heat exchanger) and/or an external reservoir. Expanded gas may be vented to atmosphere. Compressed gas may be stored in a compressed-gas reservoir. Energy stored during compression of the gas may originate from an intermittent renewable energy source (e.g., of wind or solar energy), and gas may be expanded to recover energy when the intermittent renewable energy source is nonfunctional.

These and other objects, along with advantages and features of the invention, will become more apparent through reference to the following description, the accompanying drawings, and the claims. Furthermore, it is to be understood that the features of the various embodiments described herein are not mutually exclusive and can exist in various combinations and permutations. Note that as used herein, the terms "pipe," "piping" and the like shall refer to one or more conduits that are rated to carry gas or liquid between two points. Thus, the singular term should be taken to include a plurality of parallel conduits where appropriate. Herein, the terms "liquid" and "water" interchangeably connote any mostly or substantially incompressible liquid, the terms "gas" and "air" are used interchangeably, and the term "fluid" may refer to a liquid or a gas unless otherwise indicated. As used herein unless otherwise indicated, the term "substantially" means ±10%, and, in some embodiments, ±5%. A "valve" is any mechanism or component for controlling fluid communication between fluid paths or reservoirs, or for selectively permitting control or venting. The term "cylinder" refers to a chamber, of uniform but not necessarily circular cross-section, which may contain a slidably disposed piston or other mechanism that separates the fluid on one side of the chamber from that on the other, preventing fluid movement from one side of the chamber to the other while allowing the transfer of force/pressure from one side of the chamber to the next or to a mechanism outside the chamber. A "cylinder assembly" may be a simple cylinder or include multiple cylinders, and may or may not have additional associated components (such as mechanical linkages among the cylinders). The shaft of a cylinder may be coupled hydraulically or mechanically to a mechanical load (e.g., a hydraulic motor/pump or a crankshaft) that is in turn coupled to an electrical load (e.g., rotary or linear electric motor/generator attached to power electronics and/or directly to the grid or other loads), as described in the '595 and '853 applications. As used herein, "thermal conditioning" of a heat-exchange fluid does not include any modification of the temperature of the heat-exchange fluid resulting from interaction with gas with which the heat-exchange fluid is exchanging thermal energy; rather, such thermal conditioning generally refers to the modification of the temperature of the heat-exchange fluid by other means (e.g., an external heat exchanger).

BRIEF DESCRIPTION OF THE DRAWINGS

In the drawings, like reference characters generally refer to the same parts throughout the different views. Cylinders, rods, and other components are depicted in cross section in a manner that will be intelligible to all persons familiar with the art of pneumatic and hydraulic cylinders. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 1:
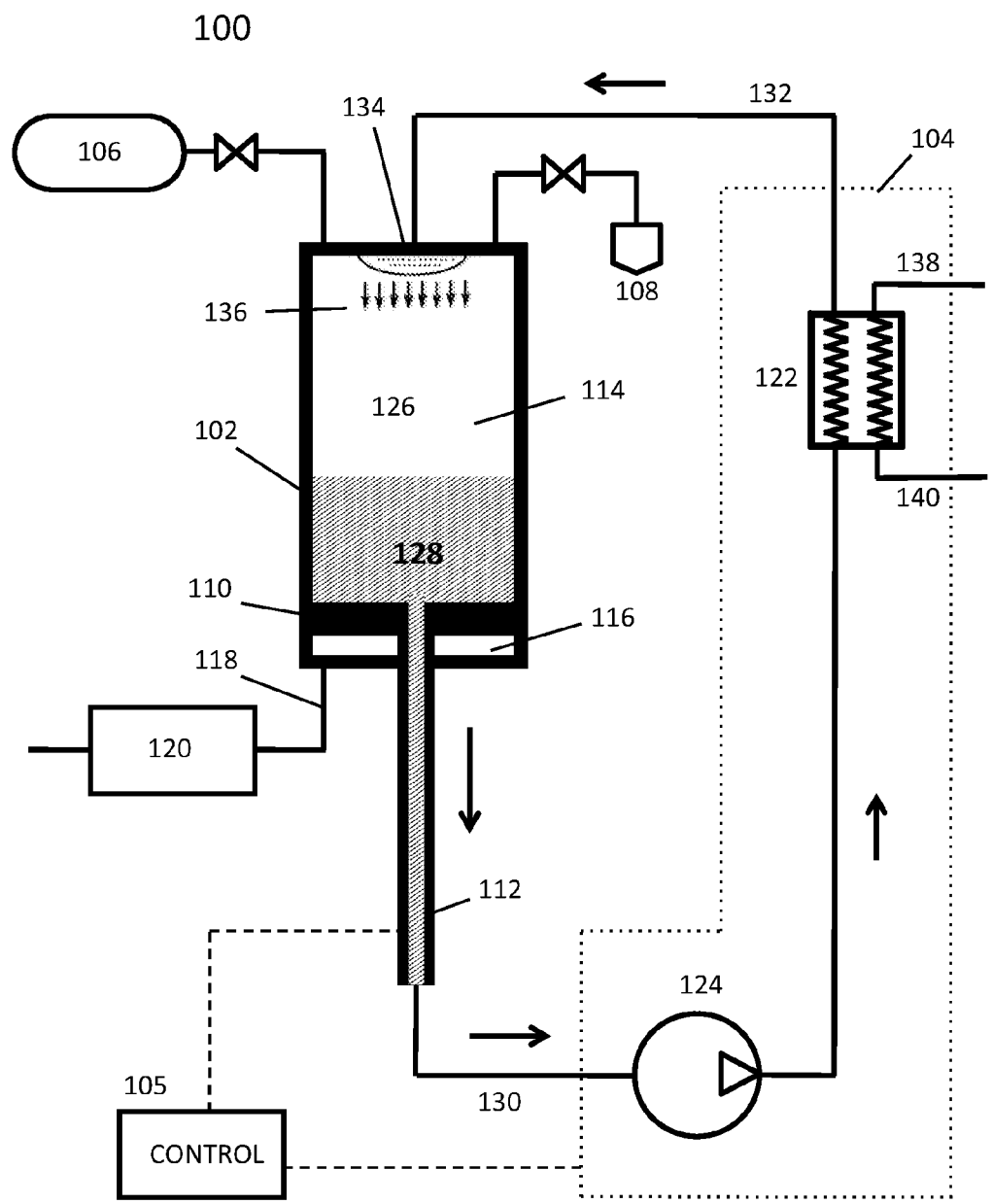
FIG. 1 is a schematic diagram of portions of a compressed-air energy storage and recovery system lacking particular embodiments of the invention.

FIG. 1 depicts an illustrative system 100 not employing various embodiments of the present invention. Subsequent figures will clarify the application of the embodiments to such a system. System 100 may be part of a larger system (not otherwise depicted) for the storage and release of energy. Nonetheless, embodiments of the invention may include various features depicted in FIG. 1 (e.g., control system 105, reservoir 106, vent 108, etc.) even if not depicted in subsequent figures and/or specifically described. The system 100 includes a cylinder assembly 102, a heat-exchange subsystem 104, and a control system 105 for controlling operation of the various components of system 100. During system operation, compressed air is either directed into a storage reservoir 106 (e.g., one or more pressure vessels or caverns) during storage of energy or released from reservoir 106 during recovery of stored energy. Air is admitted to the system 100 through vent 108 during storage of energy, or exhausted from the system 100 through vent 108 during release of energy.

The control system 105 may be any acceptable control device with a human-machine interface. For example, the control system 105 may include a computer (for example a PC-type) that executes a stored control application in the form of a computer-readable software medium. More generally, control system 105 may be realized as software, hardware, or some combination thereof. For example, control system 105 may be implemented on one or more computers, such as a PC having a CPU board containing one or more processors such as the Pentium, Core, Atom, or Celeron family of processors manufactured by Intel Corporation of Santa Clara, Calif., the 680x0 and POWER PC family of processors manufactured by Motorola Corporation of Schaumburg, Ill., and/or the ATHLON line of processors manufactured by Advanced Micro Devices, Inc., of Sunnyvale, Calif. The processor may also include a main memory unit for storing programs and/or data relating to the methods described above. The memory may include random access memory (RAM), read only memory (ROM), and/or FLASH memory residing on commonly available hardware such as one or more application specific integrated circuits (ASIC), field programmable gate arrays (FPGA), electrically erasable programmable read-only memories (EEPROM), programmable read-only memories (PROM), programmable logic devices (PLD), or read-only memory devices (ROM). In some embodiments, the programs may be provided using external RAM and/or ROM such as optical disks, magnetic disks, or other storage devices.

For embodiments in which the functions of controller 105 are provided by software, the program may be written in any one of a number of high-level languages such as FORTRAN, PASCAL, JAVA, C, C++, C#, LISP, PERL, BASIC or any suitable programming language. Additionally, the software can be implemented in an assembly language and/or machine language directed to the microprocessor resident on a target device.

The control system 105 may receive telemetry from sensors monitoring various aspects of the operation of system 100, and may provide signals to control valve actuators, valves, motors, and other electromechanical/electronic devices. Control system 105 may communicate with such sensors and/or other components of system 100 (and other embodiments described herein) via wired or wireless communication. An appropriate interface may be used to convert data from sensors into a form readable by the control system 105 (such as RS-232 or network-based interconnects). Likewise, the interface converts the computer's control signals into a form usable by valves and other actuators to perform an operation. The provision of such interfaces, as well as suitable control programming, is clear to those of ordinary skill in the art and may be provided without undue experimentation.

The cylinder assembly 102 includes a piston 110 (or other suitable boundary mechanism) slidably disposed therein with a center-drilled rod 112 extending from piston 110 and preferably defining a fluid passageway. The piston 110 divides the cylinder assembly 102 into a first chamber (or "compartment") 114 and a second chamber 116. The rod 112 may be attached to a mechanical load, for example, a crankshaft or hydraulic system. Alternatively or in addition, the second chamber 116 may contain hydraulic fluid that is coupled through other pipes 118 and valves to a hydraulic system 120 (which may include, e.g., a hydraulic motor/pump and an electrical motor/generator). The heat-exchange subsystem 104 includes or consists essentially of a heat exchanger 122 and a booster-pump assembly 124.

At any time during an expansion or compression phase of gas within the first or upper chamber 114 of the cylinder assembly 102, the chamber 114 will typically contain a gas 126 (e.g., previously admitted from storage reservoir 106 during the expansion phase or from vent 108 during the compression phase) and (e.g., an accumulation of) heat-exchange fluid 128 at substantially equal pressure $P_s$, (e.g., up to approximately 3,000 psig). The heat-exchange fluid 128 may be drawn through the center-drilled rod 112 and through a pipe 130 by the pump 124. The pump 124 raises the pressure of the heat-exchange fluid 128 to a pressure $P_i'$ (e.g., up to approximately 3,015 psig) somewhat higher than $P_s$, as described in the '409 application. The heat-exchange fluid 128 (which may include or consist essentially of, e.g., water or another suitable liquid) is then sent through the heat exchanger 122, where its temperature is altered, and then through a pipe 132 to a spray mechanism 134 disposed within the cylinder assembly 102. As described in the '703 application, the spray mechanism 134 may include or consist essentially of one or more spray heads (e.g., disposed at one end of cylinder assembly 102) and/or spray rods (e.g., extending along at least a portion of the central axis of cylinder assembly 102). In various embodiments, when the cylinder assembly 102 is operated as an expander, a spray 136 of the heat-exchange fluid 128 is introduced into the cylinder assembly 102 at a higher temperature than the gas 126 and, therefore, transfers thermal energy to the gas 126 and increases the amount of work done by the gas 126 on the piston 110 as the gas 126 expands. In an alternative mode of operation, when the cylinder assembly 102 is operated as a compressor, the heat-exchange fluid 128 is introduced at a lower temperature than the gas 126. Control system 105 may enforce substantially isothermal operation, i.e., expansion and/or compression of gas in cylinder assembly 102, via control over, e.g., the introduction of gas into and the exhausting of gas out of cylinder assembly 102, the rates of compression and/or expansion, and/or the operation of heat-exchange subsystem 104 in response to sensed conditions. For example, control system 105 may be responsive to one or more sensors disposed in or on cylinder assembly 102 for measuring the temperature of the gas and/or the heat-exchange fluid within cylinder assembly 102, responding to deviations in temperature by issuing control signals that operate one or more of the system components noted above to compensate, in real time, for the sensed temperature deviations. For example, in response to a temperature increase within cylinder assembly 102, control system 105 may issue commands to increase the flow rate of spray 136 of heat-exchange fluid 128.

Furthermore, embodiments of the invention may be applied to systems in which chamber 114 is in fluid communication with a pneumatic chamber of a second cylinder. That second cylinder, in turn, may communicate similarly with a third cylinder, and so forth. Any number of cylinders may be linked in this way. These cylinders may be connected in parallel or in a series configuration, where the compression and expansion is done in multiple stages.

The fluid circuit of heat exchanger 122 may be filled with water, a coolant mixture, and/or any acceptable heat-exchange medium. In alternative embodiments, a gas, such as air or refrigerant, is used as the heat-exchange medium. In general, the fluid is routed by conduits to a large reservoir of such fluid in a closed or open loop. One example of an open loop is a well or body of water from which ambient water is drawn and the exhaust water is delivered to a different location, for example, downstream in a river. In a closed-loop embodiment, a cooling tower may cycle the water through the air for return to the heat exchanger. Likewise, water may pass through a submerged or buried coil of continuous piping where a counter heat-exchange occurs to return the fluid flow to ambient temperature before it returns to the heat exchanger for another cycle.

In various embodiments, the heat-exchange fluid is conditioned (i.e., pre-heated and/or pre-chilled) or used for heating or cooling needs by connecting the fluid inlet 138 and fluid outlet 140 of the external heat exchange side of the heat exchanger 122 to an installation (not shown) such as a heat-engine power plant, an industrial process with waste heat, a heat pump, and/or a building needing space heating or cooling, as described in the '513 application. The installation may be a large water reservoir that acts as a constant-temperature thermal fluid source for use with the system. Alternatively, the water reservoir may be thermally linked to waste heat from an industrial process or the like, as described above, via another heat exchanger contained within the installation. This allows the heat-exchange fluid to acquire or expel heat from/to the linked process, depending on configuration, for later use as a heating/cooling medium in the compressed air energy storage/conversion system.

The circulating system 124 described above will typically have higher efficiency than a system which pumps liquid from a low intake pressure (e.g., approximately 0 psig) to $P_i'$, as detailed in the '409 application. The system 100 in FIG. 1 gains in efficiency by circulating the heat-exchange liquid at a pressure that continuously matches that of the gas 126 in chamber 114: no energy is expended raising liquid at ambient (e.g., 0 psig) pressure to the pressure of the gas 126. During the portion of each expansion or compression stroke when the gas 126 is at high pressure, the heat-exchange liquid is at high pressure. Consequently, the heat exchanger 122 must sustain the circulation of high-pressure liquid. A heat exchanger with this capability will tend to be much bulkier and more expensive than a device of equal heat-exchange capacity rated for lower-pressure liquid. As depicted in FIGS. 2A-2D, 3A, 3B, 4A, and 4B, embodiments of the invention enable the efficiencies of system 100 to be combined with use of a low-pressure heat exchanger.

Figure 2A:
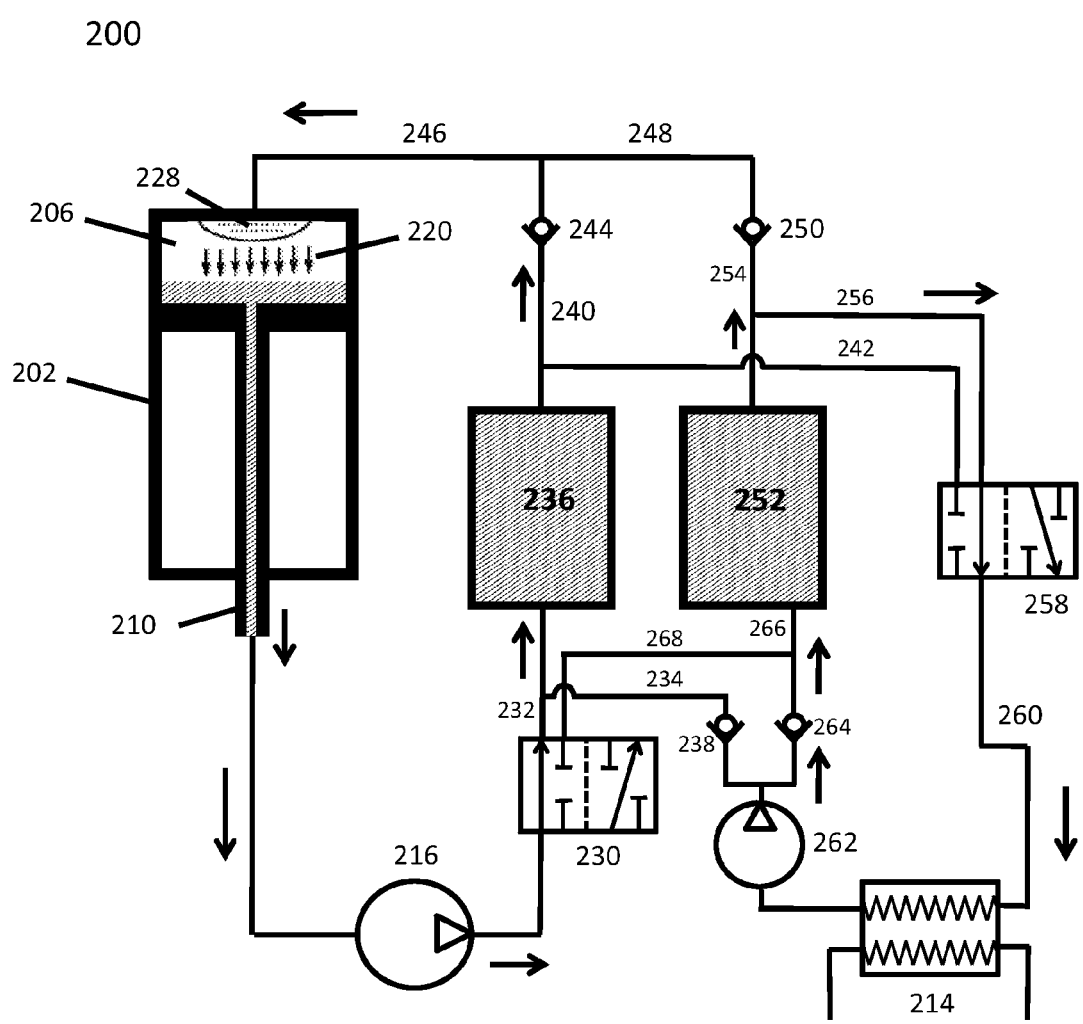
FIG. 2A is a schematic diagram of portions of a compressed-air energy storage and recovery system including two liquid reservoirs and arrangements for circulating the contents of one reservoir through a heat exchanger, in accordance with various embodiments of the invention.

FIG. 2A depicts an illustrative system 200 in accordance with various embodiments of the invention. System 200 includes a cylinder assembly 202 and pump 216 that may be respectively identical to cylinder assembly 102 and pump 124 in FIG. 1. In FIG. 2A, two reservoirs 236, 252 of liquid are alternately employed as the source of the heat-exchange spray 220 in such a way that whichever reservoir 236 or 252 is not part of the spray loop at a given time may be circulated at low pressure through a heat exchanger 214. The circulation efficiencies of system 100 in FIG. 1 may thereby be achieved using a heat exchanger 214 that is not required to sustain the passage of high-pressure fluids (and may be configured to not handle such high-pressure fluids).

In FIG. 2A, the output of pump 216 encounters a valve 230 (e.g., a two-position three-way directional valve). In the state of operation of system 200 shown in FIG. 2A, the active output of valve 230 is in communication with two pipes, 232 and 234. Pipe 232 communicates with a liquid reservoir 236. Directional valve 238 does not pass liquid from pipe 234. Thus, in this state of operation, the output of valve 230 is directed to reservoir 236 only.

The output of reservoir 236 communicates with two pipes, 240 and 242. The liquid in pipe 240 passes through a check valve 244 to pipes 246 and 248. In this state of operation, check valve 250 does not permit flow of liquid through pipe 248. Thus, in this state of operation, the output of reservoir 236 is directed through pipe 246 only.

Heat-exchange liquid passing through pipe 246 is introduced into the interior of cylinder assembly 202 as a spray 220, just as liquid is introduced into cylinder assembly 102 as a spray 136 in FIG. 1. In this state of operation, the pump 216, valve 230, pipe 232, reservoir 236, and pipes 240 and 246 form a continuous path that returns heat-exchange liquid from the center-drilled shaft 210 of the cylinder assembly 202 to the spray mechanism 228 located within the upper chamber 206 of the cylinder assembly 202. As described in the '703 application, the spray mechanism 228 may include or consist essentially of one or more spray heads (e.g., disposed at one end of cylinder assembly 202) and/or spray rods (e.g., extending along at least a portion of the central axis of cylinder assembly 202).

In this state of operation, heat-exchange liquid may be simultaneously circulated at low pressure for heat exchange, shown here through a heat exchanger 214. Low-pressure liquid from reservoir 252 exits into pipes 254 and 256. In this state of operation, low pressure heat-exchange liquid does not pass through check valve 250 because the pressure in pipe 248 is higher than that in pipes 254 and 256. Pipes 242 and 256 encounter a directional valve 258, which in this state of operation does not pass liquid from pipe 242 but passes liquid from pipe 256 to pipe 260. Pipe 260 conducts the liquid to the low-pressure heat exchanger 214.

Figure 2B:
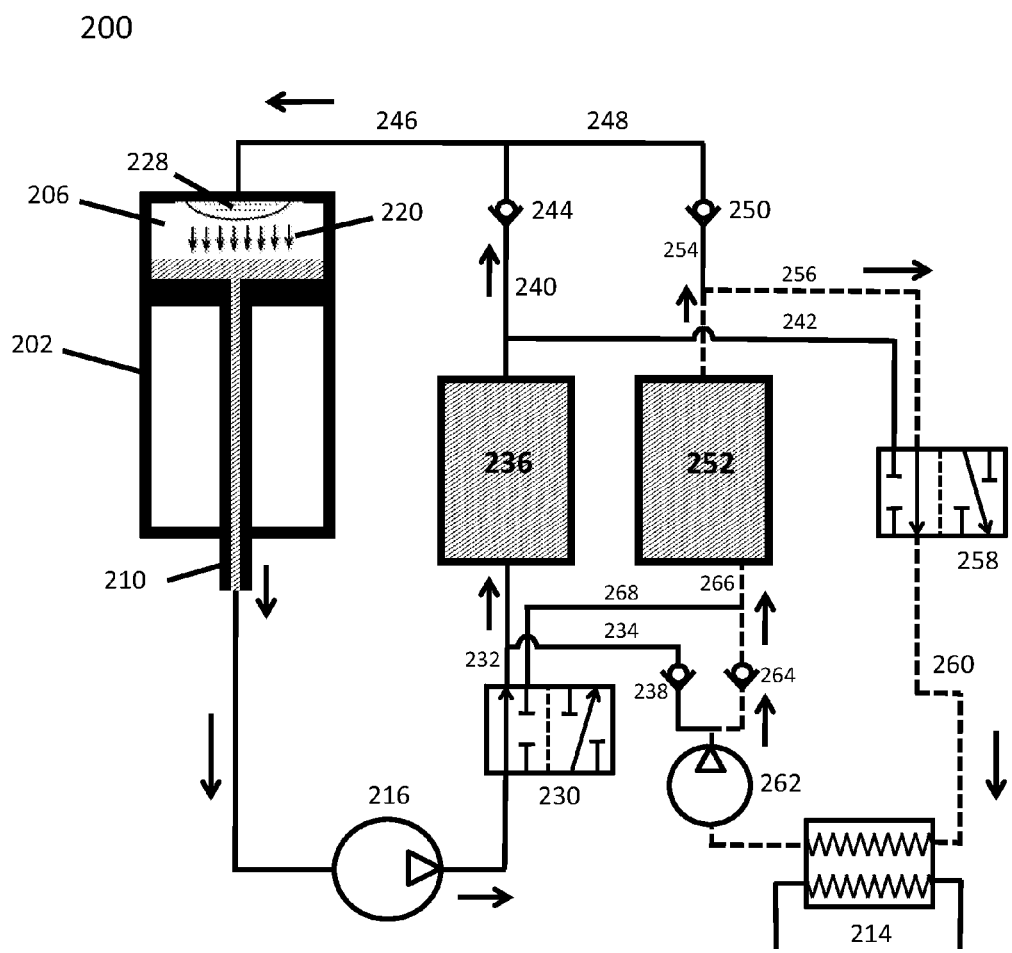
FIG. 2B illustrates the system of FIG. 2A with the low-pressure circulation loop indicated by dashed lines.

Liquid from the output of heat exchanger 214 enters low-pressure pump 262. The output of pump 262 does not pass through check valve 238 because the liquid in pipe 234, which in this state of operation communicates with the output of the high-pressure pump 216, is at higher pressure than the output of the low-pressure pump 262. The output of pump 262 passes through check valve 264, which communicates with pipes 266 and 268. Liquid does not flow through pipe 268 in this state of operation because the connection of valve 230 to pipe 268 is closed. Thus, in this state of operation liquid flows through pipe 266 into reservoir 252. In this state of operation, the pump 262, valve 264, pipe 266, reservoir 252, pipes 254 and 256, valve 258, pipe 260, and heat exchanger 214 form a continuous loop circulating low-pressure heat-exchange liquid (as depicted in FIG. 2B using dashed lines for clarity).

Figure 2C:
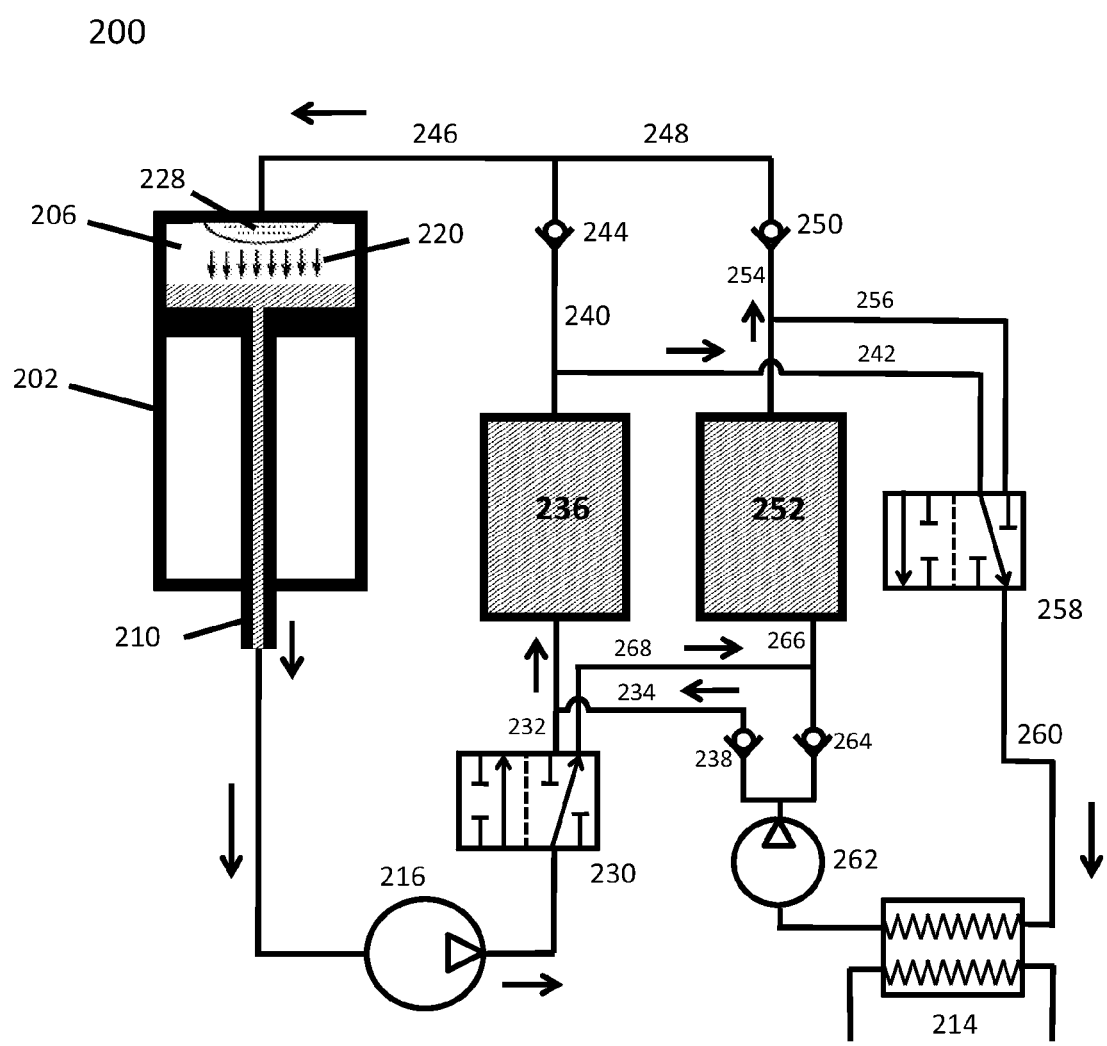
FIG. 2C illustrates the system of FIG. 2A in a different state of operation.

FIG. 2C depicts the illustrative system of FIG. 2A in a second state of operation. In this state of operation, the output of valve 230 is in communication with pipes 268 and 266. Pipe 266 communicates with liquid reservoir 252. Check valve 264 does not pass liquid from pipe 266. Thus, in this state of operation, the output of valve 230 is directed only to reservoir 252.

The output of reservoir 252 communicates with two pipes, 254 and 256. The liquid in pipe 254 passes through a check valve 250 to pipe 248. Check valve 244 does not permit flow of liquid from pipe 248 into pipe 240. Thus, in this state of operation, the output of reservoir 252 is directed through pipe 248 into pipe 246 only.

Heat-exchange liquid passing through pipe 246 is introduced into the interior of cylinder assembly 202 as spray 220. In this state of operation, the pump 216, valve 230, pipes 268 and 266, reservoir 252, and pipes 254, 248, and 246 form a continuous path that returns heat-exchange liquid from the center-drilled shaft 210 of the cylinder assembly 202 to the spray mechanism 228 located within the upper chamber 206.

In this state of operation (FIG. 2C), as in the state previously depicted in FIG. 2A, heat-exchange liquid may be simultaneously circulated at low pressure through the heat exchanger 214. Low-pressure liquid from reservoir 236 exits into pipes 240 and 242. The liquid does not pass through check valve 244 because the pressure in pipes 248 and 246 is higher than that in pipe 240. Thus, in this state of operation, low-pressure heat exchange liquid flows out of reservoir 236 through pipe 242 only. Pipe 242 encounters a valve 258, which in this state of operation does not pass liquid from pipe 256 but passes liquid from pipe 242 to pipe 260. Pipe 260 conducts the liquid to the low-pressure heat exchanger 214.

Figure 2D:
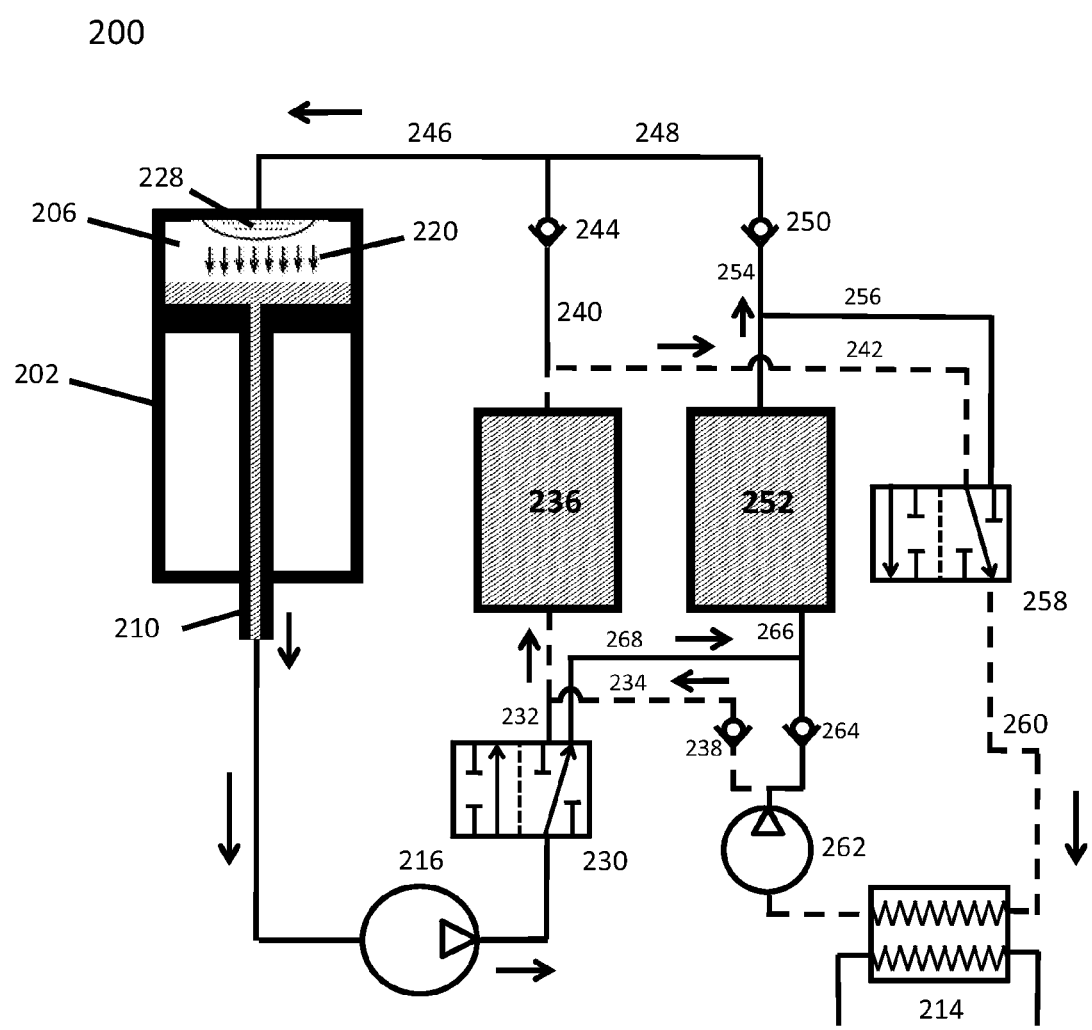
FIG. 2D illustrates the system of FIG. 2C with the low-pressure circulation loop indicated by dashed lines.

Liquid from the output of heat exchanger 214 enters the low-pressure pump 262. The output of pump 262 does not pass through check valve 264 because the liquid in pipe 266, which in this state of operation communicates with the output of the high-pressure pump 216, is at higher pressure than the output of the low-pressure pump 262. The output of pump 262 passes through check valve 238, which communicates with pipes 234 and 232. Liquid does not flow from pipe 232 through valve 230 because the connection of valve 230 to pipe 232 and 234 is closed. Thus, in this state of operation liquid flows through pipe 232 into the reservoir 236. In this state of operation, the pump 262, valve 238, pipes 234 and 232, reservoir 236, pipes 240 and 242, valve 258, pipe 260, and heat exchanger 214 form a continuous loop circulating low-pressure heat-exchange liquid (as depicted in FIG. 2D using dashed lines for clarity).

Figure 3A:
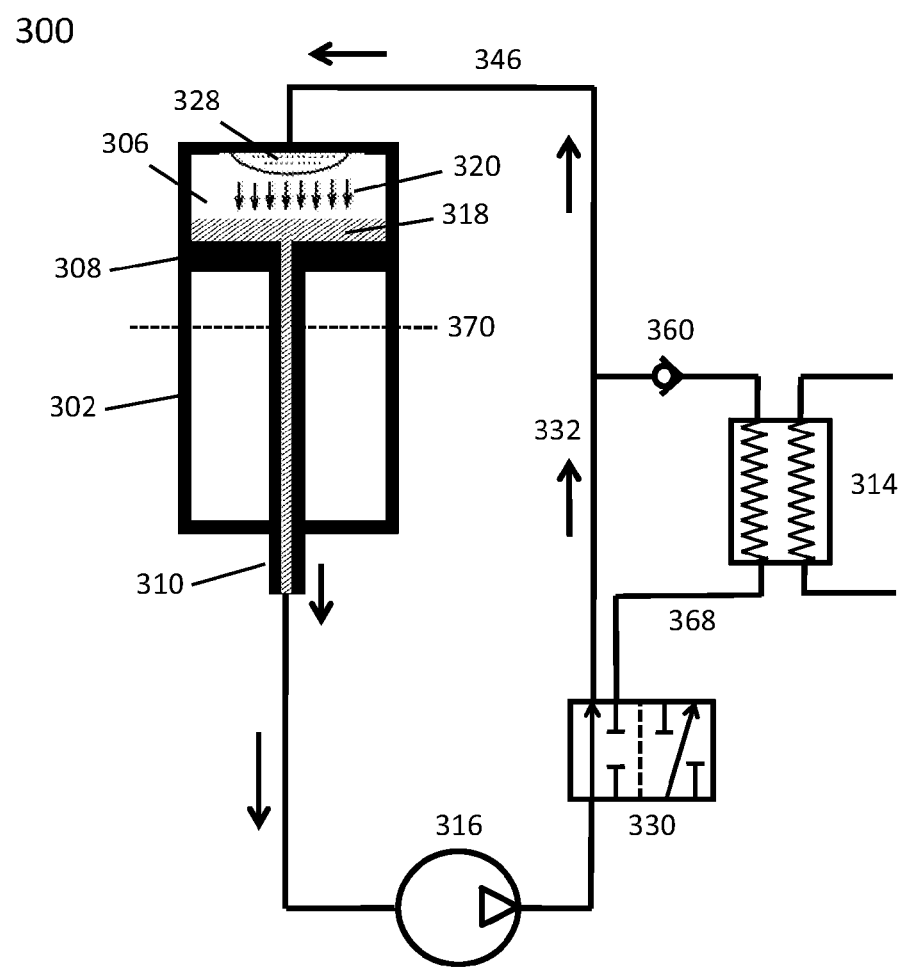
FIG. 3A is a schematic diagram of portions of a compressed-air energy storage and recovery system including a cylinder, pump, and heat exchanger, in accordance with various embodiments of the invention.

FIG. 3A depicts an illustrative system 300 in accordance with another embodiment of the present invention. System 300 includes a cylinder assembly 302 and hydraulic pump 316 that may be respectively identical to cylinder assembly 102 and pump 124 in FIG. 1. System 300 may be operated and/or configured so that heat-exchange liquid is circulated through cylinder assembly 302 only during that portion of a gas-compression or gas-expansion cycle when the pressure is low (i.e., below a fixed threshold).

In the state of operation depicted in FIG. 3A, a quantity of gas has been introduced into the upper chamber 306 of assembly 302 and is expanding. The piston 308 and its center-drilled rod 310 are moving downward. A spray 320 of heat-exchange liquid is being introduced into chamber 306 to heat the gas in chamber 306 as it expands. Heat-exchange liquid 318 is evacuated from chamber 306 through center-drilled rod 310 and enters high-pressure pump 316. The output of pump 316 encounters a valve 330, the output of which may be directed either to a pipe 332 or a heat exchanger 314. In the state of operation shown in FIG. 3A, the valve directs the output of pump 316 to pipe 332. Check valve 360 does not permit flow of liquid from pipe 332 into the heat exchanger 314. The liquid in pipe 332 therefore enters pipe 346 and is directed to chamber 306 of cylinder assembly 302 through spray mechanism 328. As described in the '703 application, the spray mechanism 328 may include or consist essentially of one or more spray heads (e.g., disposed at one end of cylinder assembly 302) and/or spray rods (e.g., extending along at least a portion of the central axis of cylinder assembly 302).

At some point in the expansion of the gas in chamber 306, with concurrent, downward movement of piston 308 and rod 310, the pressure in chamber 306, and simultaneously the pressure of the liquid being circulated through pump 316 and pipes 332 and 346, drops below a specified threshold $P_{thresh}$ (e.g., 300 psig, 500 psig, or even 1000 psig, and/or approximately a maximum pressure for which heat exchanger 314 is configured). Pressures below this threshold are herein termed "low." The position of the upper surface of the piston 308 at the point where the pressure threshold is crossed is denoted in FIG. 3A by dashed line 370.

Figure 3B:
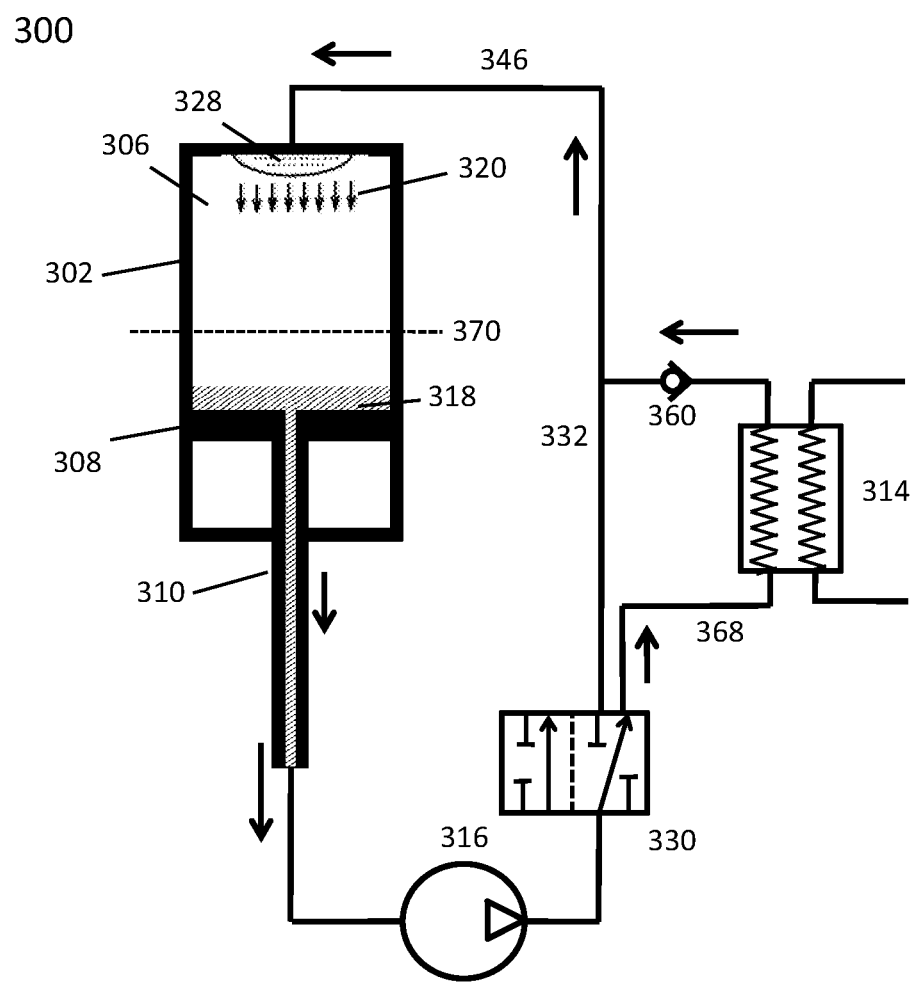
FIG. 3B illustrates the system of FIG. 3A in a different state of operation.

When piston 308 moves below line 370 (i.e., when pressure in chamber 306 drops below $P_{thresh}$), valve 330 may be operated so as to produce the state of operation shown in FIG. 3B. In FIG. 3B, the pressure in chamber 306 and the pressure of the heat-exchange fluid are low, and the output of valve 330 is directed to the heat exchanger 314. The output of the heat exchanger 314 is passed through directional valve 360 into pipe 332 and thence into pipe 346. In various embodiments, the control system 105 controls the flow of the heat-exchange fluid (e.g., whether or not the heat-exchange fluid is circulated through heat exchanger 314) based on the pressure within chamber 306. Control system 105 may be responsive to one or more sensors for detecting the pressure within chamber 306.

During a compression stroke, the order of the two operating states just described is typically reversed. That is, during the early portion of compression, when the pressure in chamber 306 is below $P_{thresh}$, the valve 330 is operated so as to direct the circulation of heat-exchange fluid through pipe 368 to heat exchanger 314. When the pressure in chamber rises above $P_{thresh}$, valve 330 is operated so as to bypass heat exchanger 314 and return heat-exchange liquid through pipes 332 and 346 to chamber 306.

The volume of heat-exchange liquid in the circuit that includes pump 316 and pipes 332, 346, and any other pipes or other components required for such circulation is, in this exemplary application of the invention, preferably large enough so that its heat capacity meets the heat-exchange needs of the system 300 during the high-pressure phase of either a compression stroke or an expansion stroke without deviating substantially in temperature (e.g., a deviation of no more than approximately 10° C.).

Figure 4A:
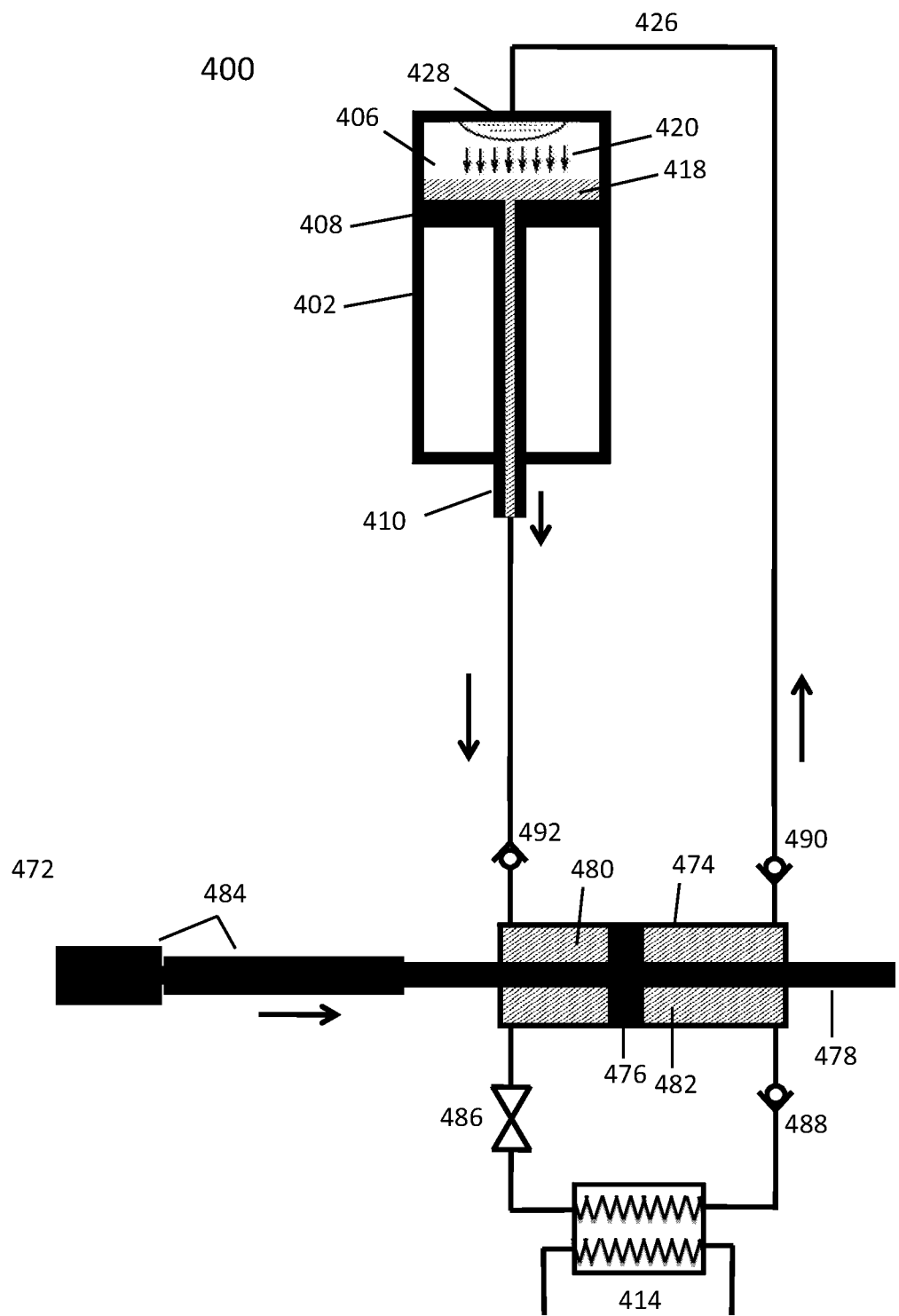
FIG. 4A is a schematic diagram of portions of a compressed-air energy storage and recovery system including a cylinder, two-chambered pump, linear actuator, and heat exchange, in accordance with various embodiments of the invention.

FIG. 4A depicts an illustrative system 400 in accordance with another embodiment of the present invention. System 400 includes a cylinder assembly 402 that may be identical to cylinder assembly 102 in FIG. 1. System 400 also includes a hydraulic cylinder pump assembly 472 containing a cylinder 474 driven by a mechanical actuator 484 in order to pump fluid from a body of fluid at high pressure to another body of fluid at somewhat higher pressure. Cylinder 474 contains a piston 476 slidably disposed therein on a rod 478. Piston 476 divides the interior of cylinder 474 into two chambers 480 and 482, which may both be substantially filled with heat-exchange liquid at all times.

In the state of operation depicted in FIG. 4A, a quantity of gas has been introduced into the upper chamber 406 of cylinder assembly 402 and is expanding. A piston 408 and its center-drilled rod 410 are moving downward. A spray 420 of heat-exchange liquid is being introduced into chamber 406 to heat the gas in chamber 406 as it expands. Heat-exchange liquid 418 is evacuated from chamber 406 through a center-drilled rod 410 and enters a chamber 480 of a cylinder 474. A linear actuator 484 (or other device capable of directing a force along rod 478) is pushing a rod 478 and a piston 476 to the right, causing the pressure in a chamber 482 to be somewhat higher (e.g., 15 psi higher) than that in chamber 480. During this state of operation, an on-off directional valve 486 is closed: together, valve 486 and a check valve 488 prevent liquid flow through or pressure increase within a low-pressure heat exchanger 414.

In the state of operation depicted in FIG. 4A, liquid passes from chamber 482 through a check valve 490, thence through a pipe 426 and into chamber 406 via spray mechanism 428. The liquid exits chamber 406 via center-drilled rod 410, passes through a directional valve 492, and enters chamber 480 of cylinder 474. As described in the '703 application, the spray mechanism 428 may include or consist essentially of one or more spray heads (e.g., disposed at one end of cylinder assembly 402) and/or spray rods (e.g., extending along at least a portion of the central axis of cylinder assembly 402).

The volume of heat-exchange liquid in the circuit that includes pump assembly 474, pipe 426, and any other pipes or other components utilized for such circulation is, in this exemplary application of the invention, preferably large enough so that its heat capacity meets the heat-exchange needs of the system 400 either during the high-pressure phase of a compression stroke or an expansion stroke, or throughout an entire compression stroke or expansion stroke.

Figure 4B:
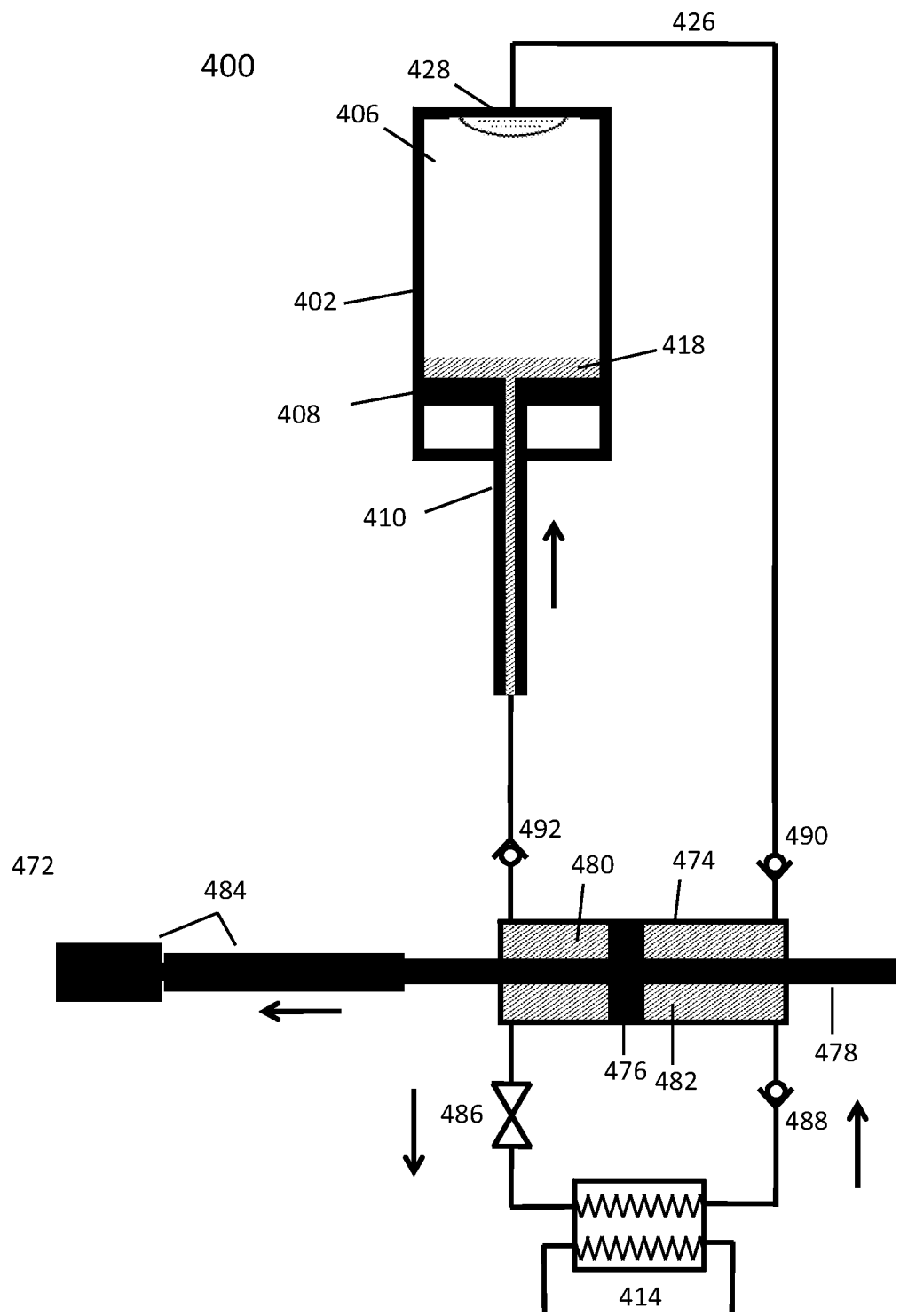
FIG. 4B illustrates the system of FIG. 4A in a different state of operation.

FIG. 4B depicts another state of operation of the system 400 shown in FIG. 4A. In this state, the piston 408 and center-drilled shaft 410 of cylinder assembly 402 are moving upward while the interior of chamber 406 is vented to an additional cylinder or to the environment by means not depicted (e.g., by vent 108). That is, the cylinder assembly 402 is performing a return stroke in preparation for expansion of another quantity of gas in chamber 406 and in so doing is performing negligible work. No spray is being generated in chamber 406 and substantially no heat-exchange fluid is moving through pipe 426 or through the center-drilled rod 410. In this state of operation, valve 486 is opened and the rod 476 and piston 478 of pump assembly 472 are moving to the left. This is causing the pressure in chamber 480 to be higher than that in chamber 482. Valve 486 is open, and liquid is passing from chamber 480, through valve 486, through low-pressure heat exchanger 414, and through check valve 488 to chamber 482. Thus, if the operating states depicted in FIG. 4A and FIG. 4B are alternated, that portion of the heat-exchange fluid that resides in chamber 480 of assembly 472 at the end of an expansion stroke is passed through the low-pressure heat exchanger 414 in order to be heated during the return stroke of the cylinder assembly 402.

Generally, the systems described herein may be operated in both an expansion mode and in the reverse compression mode as part of a full-cycle energy storage system with high efficiency. For example, the systems may be operated as both compressor and expander, storing electricity in the form of the potential energy of compressed gas and producing electricity from the potential energy of compressed gas. Alternatively, the systems may be operated independently as compressors or expanders.

Systems in accordance with embodiments of the invention may utilize a substantially incompressible fluid to minimize or eliminate dead space within one or more cylinder assemblies, as described in U.S. patent application Ser. Nos. 13/080,910 and 13/080,914, filed Apr. 6, 2011, the entire disclosure of each of which is incorporated herein by reference. As also described in these applications, embodiments of the invention may incorporate mechanisms for substantially preventing the flow of gas from the cylinder assembly into the heat-exchange components (e.g., heat exchangers, pumps, and/or pipes connected thereto and/or between the cylinder assembly and such components), and may thereby substantially prevent formation of dead space in the heat-exchange components. For example, various embodiments incorporate one or more check valves on the upstream side of one or more of the nozzles in the spray mechanism introducing heat-exchange fluid into a cylinder assembly.

In various embodiments of the invention, the heat-exchange fluid utilized to thermally condition gas within one or more cylinders incorporates one or more additives and/or solutes, as described in U.S. patent application Ser. No. 13/082,808, filed Apr. 8, 2011 (the '808 application), the entire disclosure of which is incorporated herein by reference. As described in the '808 application, the additives and/or solutes may reduce the surface tension of the heat-exchange fluid, reduce the solubility of gas into the heat-exchange fluid, and/or slow dissolution of gas into the heat-exchange fluid. They may also (i) retard or prevent corrosion, (ii) enhance lubricity, (iii) prevent formation of or kill microorganisms (such as bacteria), and/or (iv) include a defoaming agent, as desired for a particular system design or application.

Embodiments of the invention may also feature spray-mechanism designs described in U.S. patent application Ser. Nos. 13/105,986 and 13/105,988, filed May 12, 2011, the entire disclosure of each of which is incorporated herein by reference, e.g., spray mechanisms configured to fill substantially all of the volume of a cylinder with overlapping sprays of heat-exchange fluid. As also described in these applications, embodiments of the invention may control the number of nozzles of a spray mechanism actively spraying heat-exchange fluid based on, e.g., the pressure inside the cylinder assembly, rather than merely increasing a volumetric flow of heat-exchange fluid through the nozzles. Embodiments may utilize multiple groups of nozzles (of similar or different designs), more of which are utilized as the pressure within the cylinder assembly increases.

The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A method of energy storage and recovery, the method comprising:
    during each of a plurality of cycles:
        (i) in a pneumatic chamber of a cylinder, at least one of compressing a gas to store energy or expanding a gas to recover energy, and
        (ii) during the at least one of compressing the gas or expanding the gas, circulating, without thermal conditioning thereof, a heat-exchange fluid through the gas to exchange heat between the gas and the heat-exchange fluid; and
    thermally conditioning, external to the at least one of compression or expansion, at least a portion of the heat-exchange fluid between cycles,
    wherein, during each cycle, circulating the heat-exchange fluid comprises (i) pumping heat-exchange fluid from the pneumatic chamber into a first hydraulic chamber and (ii) pumping heat-exchange fluid out of a second hydraulic chamber separated from the first hydraulic chamber into the pneumatic chamber.

2. The method of claim 1, wherein the at least a portion of the heat-exchange fluid is thermally conditioned only between cycles.

3. A method of energy storage and recovery, the method comprising:
    during a first cycle:
        (i) at least one of compressing a gas to store energy or expanding a gas to recover energy, and
        (ii) during the at least one of compressing the gas or expanding the gas, circulating, without thermal conditioning thereof, a heat-exchange fluid from a first fluid reservoir through the gas to exchange heat between the gas and the heat-exchange fluid; and
    thermally conditioning, external to the at least one of compression or expansion, heat-exchange fluid from a second fluid reservoir.

4. The method of claim 1, wherein exchanging heat between the gas and the heat-exchange fluid comprises maintaining the gas at a substantially constant temperature.

5. The method of claim 3, wherein the gas is compressed or expanded within a pneumatic chamber of a cylinder.

6. The method of claim 5, wherein circulating heat-exchange fluid through the gas comprises spraying the heat-exchange fluid into the pneumatic chamber.

7. The method of claim 1, wherein the first and second hydraulic chambers are separated by a moveable mechanical boundary mechanism.

8. The method of claim 1, wherein each of the first and second hydraulic chambers is sized to contain sufficient heat-exchange fluid for at least one cycle of compression or expansion.

9. The method of claim 3, wherein thermally conditioning the heat-exchange fluid comprises pumping heat-exchange fluid from the second fluid reservoir through a heat exchanger.

10. The method of claim 9, wherein the heat-exchange fluid is pumped through a heat exchanger comprising a plate-type heat exchanger.

11. The method of claim 1, further comprising at least one of (i) venting expanded gas to atmosphere or (ii) storing compressed gas in a compressed-gas reservoir.

12. The method of claim 1, wherein energy stored during compression of the gas originates from an intermittent renewable energy source of wind or solar energy, and further comprising expanding gas to recover energy when the intermittent renewable energy source is nonfunctional.

13. The method of claim 1, wherein circulating heat-exchange fluid through the gas comprises spraying the heat-exchange fluid into the gas.

14. The method of claim 1, wherein the first and second hydraulic chambers are disposed within a single hydraulic cylinder.

15. The method of claim 1, wherein the at least a portion of the heat-exchange fluid is thermally conditioned between cycles at a pressure lower than a pressure of the at least one of compression or expansion.

16. The method of claim 3, wherein the first and second fluid reservoirs comprise separate hydraulic chambers within a hydraulic cylinder.

17. The method of claim 16, wherein the first and second fluid reservoirs are separated by a movable mechanical boundary mechanism.

18. The method of claim 3, further comprising, after thermally conditioning heat-exchange fluid from the second fluid reservoir:
    during a second cycle:
        (i) at least one of compressing a gas to store energy or expanding a gas to recover energy, and
        (ii) during the at least one of compressing the gas or expanding the gas, circulating, without thermal conditioning thereof, a heat-exchange fluid from the second fluid reservoir through the gas to exchange heat between the gas and the heat-exchange fluid; and
    thermally conditioning, external to the at least one of compression or expansion, heat-exchange fluid from the first fluid reservoir.

19. The method of claim 3, wherein exchanging heat between the gas and the heat-exchange fluid comprises maintaining the gas at a substantially constant temperature.

20. The method of claim 3, wherein each of the first and second fluid reservoirs is sized to contain sufficient heat-exchange fluid for at least one cycle of compression or expansion.

21. The method of claim 3, further comprising at least one of (i) venting expanded gas to atmosphere or (ii) storing compressed gas in a compressed-gas reservoir.

22. The method of claim 3, wherein energy stored during compression of the gas originates from an intermittent renewable energy source of wind or solar energy, and further comprising expanding gas to recover energy when the intermittent renewable energy source is nonfunctional.

* * * * *